(12) United States Patent
Watanabe et al.

(10) Patent No.: US 7,587,592 B2
(45) Date of Patent: Sep. 8, 2009

(54) DISTRIBUTION METHOD, DISTRIBUTION SYSTEM, AND TERMINAL DEVICE

(75) Inventors: Nobuyuki Watanabe, Sayama (JP);
Hisanori Sawada, Tokyo (JP); Hideaki Nishio, Yokohama (JP); Tomonori Nakamura, Kawasaki (JP); Fumiaki Miura, Yokosuka (JP); Atsuki Tomioka, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 901 days.

(21) Appl. No.: 10/509,545

(22) PCT Filed: Mar. 28, 2003

(86) PCT No.: PCT/JP03/03974

§ 371 (c)(1),
(2), (4) Date: Sep. 24, 2004

(87) PCT Pub. No.: WO03/083646

PCT Pub. Date: Oct. 9, 2003

(65) Prior Publication Data

US 2005/0160045 A1  Jul. 21, 2005

(30) Foreign Application Priority Data

Apr. 3, 2002  (JP) .............................. 2002-101756

(51) Int. Cl.
*H04L 29/02* (2006.01)
*G06F 17/30* (2006.01)
(52) U.S. Cl. ...................... 713/165; 713/164; 713/166; 726/2; 726/6
(58) Field of Classification Search ...................... None
See application file for complete search history.

(56) References Cited

U.S. PATENT DOCUMENTS

| 5,673,315 | A | * | 9/1997 | Wolf ............................ 705/59 |
| 5,708,709 | A | | 1/1998 | Rose |
| 6,269,421 | B1 | | 7/2001 | Nishimura |
| 6,317,742 | B1 | | 11/2001 | Nagaratnam et al. |
| 6,345,288 | B1 | | 2/2002 | Reed et al. |
| 6,766,353 | B1 | * | 7/2004 | Lin et al. .................... 709/203 |
| 6,971,016 | B1 | * | 11/2005 | Barnett ....................... 713/182 |
| 6,976,165 | B1 | * | 12/2005 | Carpentier et al. .......... 713/165 |

(Continued)

FOREIGN PATENT DOCUMENTS

EP  0 813 132 A2  12/1997

(Continued)

OTHER PUBLICATIONS

Office Action issued Oct. 16, 2007 in Japanese Patent Application No. 2003-581004 (with translation).

(Continued)

*Primary Examiner*—Nasser G Moazzami
*Assistant Examiner*—Fatoumata Traore
(74) *Attorney, Agent, or Firm*—Brinks Hofer Gilson & Lione

(57) ABSTRACT

Mobile unit 16 which can activate Java-AP software obtains ADF 205 from IP server unit 13, receives SDF (security descriptive file) 204 by using ADF 205 from administering server unit 18 which a trustworthy organization (a communication provider which administers mobile packet communication network 15) administers, and obtains Jar file 206 by using ADF 205 from IP server unit 13. Then, mobile unit 16 installs Java-AP software containing these files. Java-AP, which is achieved by activating the installed Java-AP software, operates within the range of authorization expressed by policy information contained in SDF 204.

18 Claims, 18 Drawing Sheets

U.S. PATENT DOCUMENTS

| | | | |
|---|---|---|---|
| 2002/0073072 | A1 | 6/2002 | Fukumoto |
| 2003/0061487 | A1 | 3/2003 | Angelo et al. |
| 2005/0005099 | A1 | 1/2005 | Naruse et al. |
| 2005/0166264 | A1 | 7/2005 | Yamada et al. |

FOREIGN PATENT DOCUMENTS

| | | |
|---|---|---|
| EP | 1 033 652 A2 | 9/2000 |
| EP | 1 132 796 A1 | 9/2001 |
| EP | 1 289 326 A1 | 3/2003 |
| EP | 1 326 396 A2 | 7/2003 |
| JP | 10-83310 A | 3/1998 |
| JP | 10-91427 A | 4/1998 |
| JP | 11-205767 A | 7/1999 |
| JP | 2001-117769 A | 4/2001 |
| JP | 2001-216043 A | 8/2001 |
| JP | 2001-243062 A | 9/2001 |
| JP | 2003-50641 A | 2/2003 |
| WO | WO 98/21683 A2 | 5/1998 |
| WO | WO 00/42498 A1 | 7/2000 |

OTHER PUBLICATIONS

Li Gong, "Java2 Platform Security", Japan, Pearson Education, Inc., Nov. 30, 2000, $1^{st}$ edition, pp. 41-44 and 123-138 (ISBN: 4-89471-193-1) (with conscious explanation).

ASCII Book Editorial Department, "i mode Java programming—Standalone Applications: Newly-Revised Edition", Japan, ASCII Corporation, May 21, 2001, $1^{st}$ Edition, pp. 19, 20 and 40-52 (ISBN: 4-7561-3790-3) (with conscious explanation).

Chinese Office Action dated Dec. 1, 2006.

Chinese Office Action dated May 12, 2006.

NTT DoCoMo, "i-mode Java Content Developer's Guide -Functional Descriptions-", Release 1.1, May 14, 2000.

Jess Garms, "Professional Java Security", Publishing House of Electronics Industry, Jan. 31, 2002.

Megler, V., "i-mode From bandwidth problem into Internet phenomenon", *Developerworks*, Feb. 2002, XP002329582, 13 Pages.

Sun Microsystems, Inc., "Default Policy Implementation and Policy File Syntax", *Java Sun*, Oct. 30, 1998, XP002329583, 11 Pages.

Edited by ASCII Shoseki Henshubu "i-Mode Java Programming—Stand Alone Application Part revised new edition" *ASCII Coup.*, May 21, 201, total 17 pages.

Li, G. "Java Series Java2 Platform Security", *Kabushiki Kaisha Pearson Education*, First Edition, Nov. 30, 2000, total 14 pages.

Computer Today, No. 87, Sep. 1, 1998, total 9 pages.

Translation of International Preliminary Examination Report.

Schneier, "Applied Cryptography, Protocols, Algorithms and Source Code in C", $2^{nd}$ edition, 1996 ISBN: 0471128457, p. 38.

Stalling, "Cryptography and network security", 2nd edition, 1998, ISBN: 0138690170 in view of Angelo (USPUB 2003/0061487), pp. 243-254.

Feghhi, et al., "Digital Certificates Applied Internet Security", 1999, ISBN: 0201309807, pp. 61-89.

Kaku, T. et al., "Introduction to Java Programming in i-mode, $1^{st}$ Edition" *Nikkei Business Publications, Inc.*, Mar. 26, 2001, pp. 37-41 (with partial translation).

"i Appli Service & 503i Series" *Business Communication*, vol. 38, No. 2, Feb. 1, 2001, pp. 44-47 (with partial translation).

Jaworski, J., "Java 2 Security Programming" Java Security Handbook, $1^{st}$ Edition, Apr. 25, 2001, pp. 79-90, 529-541(with partial translation).

Kawaguchi, "Practically Useful Homepages vol. 30", Nikkei PC21, Nikkei Business Publication, Inc., Jun. 1, 2000, vol. 5, No. 11 pp. 150-154 (with partial translation).

Japanese Office Action issued Aug. 28, 2007 in Japanese Patent Application No. 2002-001843 (with translation).

Japanese Office Action issued Mar. 13, 2007 in Japanese Patent Application No. 2003-096088 (with translation).

Japanese Office Action issued Jul. 22, 2008 in Japanese Patent Application No. 2002-001843 (with translation).

Supplementary European Search Report issued Nov. 12, 2008 in European Application No. 03715596.7, 5 pages.

\* cited by examiner

FIG. 2

| APID | HASH VALUE | PACKAGE URL | ... | SDF-URL | PUBLIC KEY |
|---|---|---|---|---|---|

FIG. 3

| APID | POLICY INFORMATION | EXPIRATION DATE |
|---|---|---|

FIG. 4

| TRUSTED API | PERMISSION |
|---|---|
| getPhoneList() | ○ |
| getCallHistory() | × |
| getMsStatus() | ○ |

```
<OBJECT declare id="application.declaration"
data="http://www.ccc.co.jp/shogi.jam>
TSUME-SHOGI
</OBJECT>
   SOFTWARE FOR ~. CLICK
<A ijam="#application.declaration">HERE</A>
TO DOWNLOAD
```

```
<OBJECT declare id="application.declaration"
data="http://www.ccc.co.jp/horoscope.jam>
HOROSCOPE
</OBJECT>
SOFTWARE FOR ~. CLICK
<A ijam="#application.declaration">HERE</A>
TO DOWNLOAD
```

DISTRIBUTION METHOD, DISTRIBUTION SYSTEM, AND TERMINAL DEVICE

TECHNICAL FIELD

The present invention relates to transmitting application software to terminal units.

BACKGROUND ART

Mobile units equipped with a function of executing Java-AP (Java Application) software by carrying out a program written in accordance with Java (trademark registered) programming language, and downloaded via a network are in widespread use.

Java-AP software includes a Jar (Java Archive) file and an ADF (Application Descriptor File). The Jar file contains a program, which provides a user with certain Java-AP. The ADF is dependent upon the Jar file, and contains, for example, URL showing where a Jar file is stored (hereinafter, referred to as package URL), the size of a Jar file, the most recent date when a Jar file is changed and other necessary information.

A mobile unit downloads the relevant software to the desired Java-AP by following the process described below. First, the mobile unit obtains an ADF pertaining to the desired Java-AP from a server unit, which constitutes WWW (World Wide Web).

The mobile unit, which obtains an ADF checks the content of the ADF and the available volume of the memory installed in the mobile unit to determine whether the Jar file pertaining to the desired Java-AP can be installed in the mobile unit. When the mobile unit determines that Java-AP software can be installed, the mobile unit obtains from a server unit constituting WWW a Jar file, which contains the Java-AP software, by using package URL contained in the ADF. Hence, the process of downloading Java-AP software is complete when the Jar file is obtained. Hereinafter, in the mobile unit, installation of the downloaded Java-AP software is carried out, and the Java-AP software can be activated when required.

Incidentally, when the Java-AP software is installed in a mobile unit the activation of Java-AP is subject to greater restriction than the activation of functions that are native to the mobile unit, such as a communication application function. The activation of Java-AP is restricted in that it is unable to access confidential data contained in a mobile unit, such as telephone numbers for example. By imposing strict restrictions in this manner, leakage or falsification of confidential data contained in a mobile unit occurring due to malfunctioning Java-AP or caused intentionally, can be prevented.

However, imposing the above-mentioned restriction on all Java-AP uniformly does not adequately meet the needs of a user of a mobile unit or an IP (information provider). For example, some users seem to feel that Java-AP could be allowed to refer to some of the private information stored in a mobile unit as long as security is guaranteed. Also, some IPs wish to provide more useful Java-AP, which uses some of the private information stored in a mobile unit, or some of the functions a mobile unit is equipped with.

To fulfill these requirements, a system in which a trustworthy organization such as a communication provider providing a communication service to users of mobile units, is entrusted with the responsibility of authorizing Java-AP to operate with greater flexibility. The trustworthy organization notifies the operational rules to mobile units using Java-AP, and the mobile units can restrict the operation of Java-AP on the basis of the prescribed rules. In this system, only a trustworthy organization should be entrusted to administer the authorization of a more flexible operation of Java-AP.

When the above-mentioned system is applied to the downloading process of Java-AP software, information showing the authorization in an ADF or a Jar file must be included by a trustworthy organization. Since a Jar file is updated by an IP as required, it is appropriate for an IP to own a Jar file. However, if an IP owns a Jar file, the organization entrusted to authorize the operation of Java-AP cannot at the same time own the Jar file. Hence, it is preferable for the trustworthy organization to own an ADF rather than the Jar file, and the ADF should contain data showing authorization.

However, since the content of an ADF is dependent upon a Jar file, an ADF owned by a trustworthy organization needs to be updated once an IP updates a Jar file. At this stage, the ADF is updated by cooperation between the trustworthy organization and an IP since the trustworthy organization needs to administer the ADF so as to exclude the involvement of other companies. The drawback in this procedure is that the operation becomes busy. Also, updating an ADF becomes necessary at times even without the updating of a Jar file when, for example, access to a certain Jar file gets flooded, and the Jar file is moved to another server unit in the IP. In this instance, since the location where the Jar file is stored is changed, a package URL contained in the ADF needs to be changed. However, since the ADF is administered by the trustworthy organization and excludes the involvement of other agents, the updating operation of an ADF could become a very busy one.

DISCLOSURE OF INVENTION

The present invention was developed to overcome the stated problems of the conventional art, and its object is to provide to a terminal unit, which permits operation in accordance with authorization; a system to enable transmission of software for achieving the application by transmitting a plurality of files dependent upon each other.

The present invention provides a transmission method comprising: a process for a transmission system comprising an information providing server unit storing an entity file containing software for achieving an application; an administering server unit storing a security descriptive file containing authorization information showing authorization given to an application achieved when a terminal unit executes the software; and another information providing server storing an application descriptive file having contents dependent upon the entity file, into which a storage location of the entity file and a storage location of the security descriptive file are written; a process for transmitting an application descriptive file to a terminal unit when a storage location of the application descriptive file is notified by the terminal unit; a process for the terminal unit to notify to the transmission system a storage location of the security descriptive file contained in the application descriptive file transmitted from the transmission system; a process for the transmission system to transmit to the terminal unit the security descriptive file with security assured on the basis of the storage location of the notified security descriptive file; a process for the terminal unit to notify to the transmission system the storage location of an entity file contained in the application descriptive file transmitted from the transmission system; and a process for the transmission system to transmit to the terminal unit the entity file on the basis of the storage location of the notified entity file.

In the above-mentioned method, the transmission system, when a storage location of an application descriptive file is notified by the terminal unit, transmits the application descriptive file to the terminal unit; the terminal unit notifies to the transmission system the storage location of the security descriptive file contained in the obtained application descriptive file; the transmission system, on the basis of the storage location of the notified security descriptive file, transmits to a terminal unit the security descriptive file with security assured; the terminal unit notifies to the transmission system the storage location of the entity file contained in the application descriptive file transmitted from the transmission system; and the transmission system, on the basis of the storage location of the notified entity file, transmits to the terminal unit the entity file.

Also, the present invention provides a terminal unit comprising: a communication unit for carrying out communication with a unit in a network; a storage unit; and a controller, wherein the controller comprises: (a) means for transmitting by the communication unit to a transmission system in the network a first transmission request to receive an application descriptive file from an information providing server in the transmission system and storing the application descriptive file in the storage unit, the first transmission request containing information on a storage location of the application descriptive file, the application descriptive file containing information on a storage location of an entity file containing software for achieving an application, and information on a storage location of a security descriptive file containing authorization information showing authorization given to an application achieved by executing the software; (b) means for transmitting by the communication unit to the transmission system a second transmission request to receive a security descriptive file, the second transmission request containing information on a storage location of the security descriptive file, contained in an application descriptive file received from the transmission system; (c) means for transmitting by the communication unit to the transmission system a third transmission request to receive an entity file from an information providing server in the transmission system, the third transmission request containing information on a storage location of the entity file contained in an application descriptive file received from the transmission system; and (d) means for restricting, when execution of software contained in an entity file stored in the memory unit is commanded, operation of an application achieved by execution of the software, in accordance with authorization information contained in a security descriptive file corresponding to the entity file.

In this case, in the terminal unit, the transmission system assures security by transmitting to the terminal unit the security descriptive file after encrypting, and the controller of the terminal unit may comprise a means for decrypting an encrypted security descriptive file transmitted by the transmission system.

Also, the controller of the terminal unit may receive the security descriptive file by the communication unit via a communication path whose security is assured.

In this case the controller of the terminal unit may receive the security descriptive file by encrypted communication.

Also, the controller of the terminal unit may receive the security descriptive file by the communication unit via a mobile communication network and an exclusive line.

In this case, the controller of the terminal unit may receive the security descriptive file by encrypted communication via a mobile communication network.

In a preferred embodiment, a means for restricting operation of an application in the controller of the terminal unit may restrict use of a resource on the basis of authorization information contained in the security descriptive file.

In this case, the resource may be a hardware resource inside the terminal unit; a hardware resource outside the terminal unit which the terminal unit can use; a software resource inside the terminal unit; a software resource outside the terminal unit which the terminal unit can use; or a network resource which the terminal unit can use.

In a preferred embodiment, means for restricting operation of an application in the controller of the terminal unit may determine a type of a use of a resource on the basis of the authorization information.

In a preferred embodiment, a terminal unit wherein the application descriptive file contains a public key of a communication provider which provides communication service to the terminal unit, wherein the security descriptive file is signed by a secret key of the communication provider, and wherein the controller inspects authenticity of a security descriptive file transmitted by the transmission system using a public key contained in the application descriptive file and notifies a storage location of the entity file to the transmission system only when the authenticity is proved, is provided.

Also, in a preferred embodiment, a terminal unit wherein the application descriptive file and the security descriptive file contain an application identifier assigned to a corresponding application, and wherein the controller compares an application identifier contained in an application descriptive file transmitted by the transmission system to an application identifier contained in a security descriptive file transmitted by the transmission system, and notifies a storage location of the entity file to the transmission system only when both identifiers match, is provided.

Also, the controller of the terminal unit may notify a storage location of the security descriptive file to the transmission system only when a storage location of the security descriptive file written in the application descriptive file is inside the administering server unit.

In a preferred embodiment, the security descriptive file contains time limit information showing an expiration date of a corresponding application, and the controller of the terminal unit may comprise a means for repeatedly receiving the security descriptive file in a chronological order from the transmission system by repeatedly notifying a storage location of the security descriptive file to the transmission system in a chronological order; and renewing an expiration date of the application on the basis of the time limit information contained in the security descriptive file repeatedly received.

In this case, the terminal unit may renew an expiration date of the application only when the security descriptive file is properly transmitted from the transmission system.

In a preferred embodiment, the terminal unit may be a mobile unit.

Also, the present invention provides a transmission system comprising: one or a plurality of server units wherein an entity file, a security descriptive file and an application descriptive file are stored, the entity file containing software for achieving an application, the security descriptive file containing authorization information showing authorization given to an application achieved by executing the software, and application descriptive file having contents depending upon the entity file into which storage locations of the entity file and the security descriptive file are written, wherein a server unit among one or a plurality of server units in which the security descriptive file is stored is an administering server unit to which authorization for administering a security descriptive file is given, wherein each of the server units comprises a means for returning to an originator of notification a file when a storage location of the file is notified, and wherein the administering server unit, when a storage location of the security descriptive file is notified, returns the security descriptive file to an originator of notification with security assured.

BRIEF DESCRIPTION OF THE DRAWINGS

FIG. 2 is a conceptual figure showing the data configuration of an ADF inherent to the system.

FIG. 3 is a conceptual figure showing the data configuration of an SDF stored in an administering server unit in the system.

FIG. 4 is a conceptual figure showing the content of policy information contained in the SDF.

DETAILED DESCRIPTION OF THE DRAWINGS AND THE PRESENTLY PREFERRED EMBODIMENTS

Hereinafter, by referring to figures, a transmission system, which is one mode of the present invention, is explained. In figures, identical codes are given to parts that are common.

(1) Configuration

Figure 1:
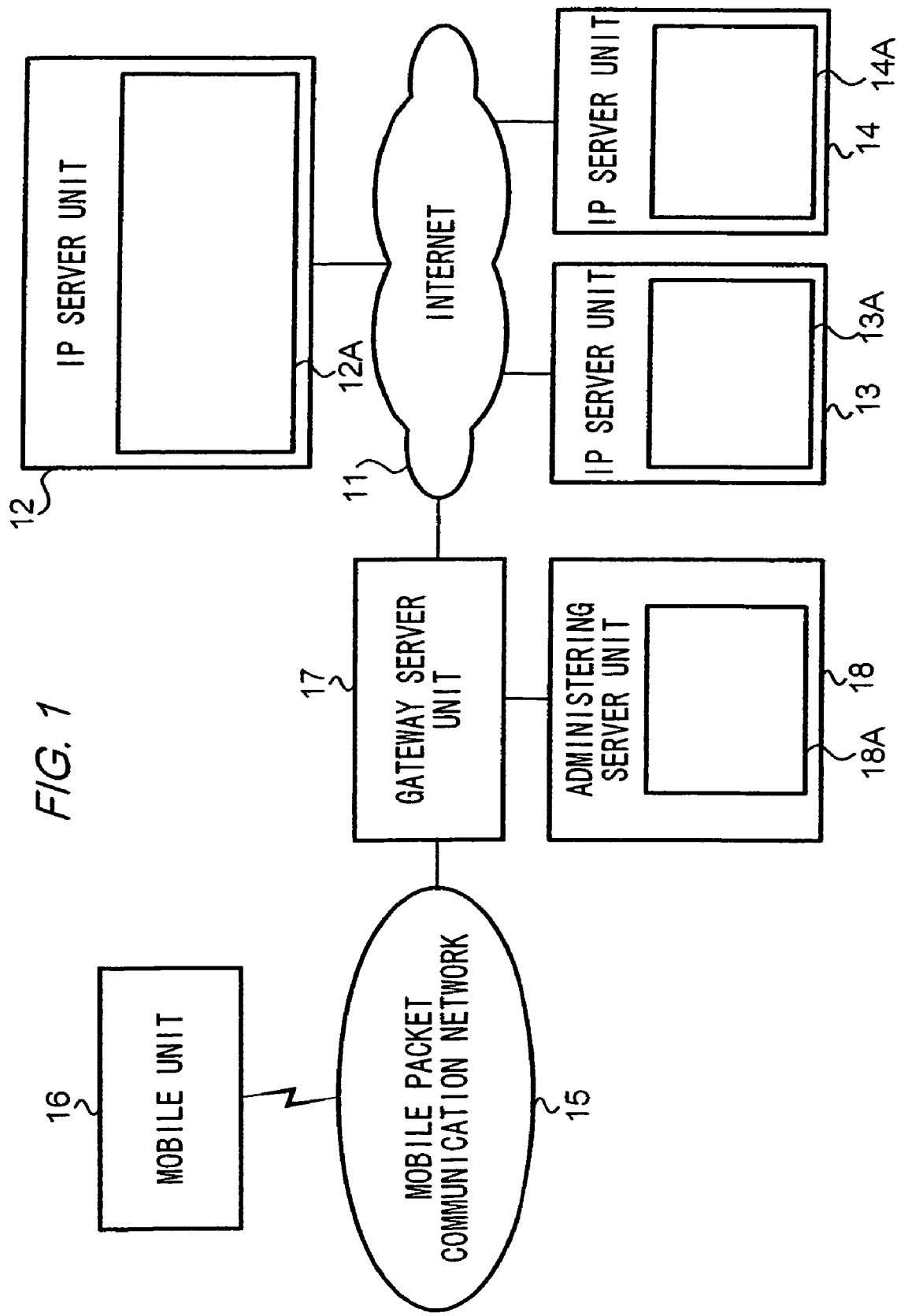
FIG. 1 is a block diagram showing the configuration of the transmission system of one embodiment for executing the present invention.

As shown in FIG. 1, in the transmission system, IP server units 12 to 14 are connected to Internet 11. IP server unit 12 is administered by the first IP (Internet Provider), and IP server units 13 and 14 are administered by the second IP, which differs from the first IP. IP server units 12 to 14 constitute WWW, and each is equipped with similar hardware and functions to those of a general WWW server unit. Mobile packet communication network 15 is a network a communication provider uses to provide a mobile packet communication service. Mobile unit 16 can perform radio packet communication with mobile packet communication network 15. Gateway server unit 17 is administered by the same communication provider as that of mobile packet communication network 15. Gateway server unit 17 is a unit for connecting mobile packet communication network 15 and Internet 11, and has similar configuration to that of a general gateway server unit. Administering server unit 18 is connected to gateway server unit 17 by an exclusive line. Administering server unit 18 also constitutes WWW, and has similar hardware and a function to those of a general WWW unit. Gateway server unit 17 performs packet communication between mobile packet communication network 15 and Internet 11, packet communication between administering server unit 18 and mobile packet communication network 15, and packet communication between administering server unit 18 and Internet 11. Mobile unit 16, by using the relaying function, is able to perform packet communication with IP server units 12 to 14 via mobile packet communication network 15 and Internet 11. Several mobile units exist in the actual transmission system, but only one mobile unit 16 is shown to avoid complicating the figures. For the same reason, only IP server units 12 to 14 are shown.

In the transmission system, mobile unit 16 is capable of receiving Java-AP software from the desired site on Internet 11. Software which mobile unit 16 is capable of receiving is distinguished between the one pertaining to a trusted Java-AP and the one pertaining to a non-trusted Java-AP. A trusted Java-AP software is one, which the communication provider administering mobile packet communication network 15 guarantees authenticity of on the basis of the contract with IP administering IP server units 12 to 14. A non-trusted Java-AP software is any Java-AP software other than a trusted Java-AP software.

Administering server unit 18 stores each SDF (Security Descriptive File) pertaining to each trusted Java-AP software, which is transmitted in the transmission system. SDF is a file, which is produced by the communication provider administering mobile packet communication network 15, and is the file necessary for downloading into a mobile unit the Java-AP software, which uses trusted API (Application Interface) of the mobile unit. An explanation of trusted API will follow later. As shown in FIG. 3, SDF contains APID for detecting trusted Java-AP software, policy information, and the expiration date. The information is encrypted by a secret key of a communication provider. Policy information is the information showing restriction on the operation of trusted Java-AP in mobile unit 16. Policy information and the restriction on Java-AP's operation carried out on the basis of the policy information will be explained in detail afterwards.

In the present embodiment, when a request is sent for transmission of trusted Java-AP Software that mobile unit 16 desires, ADF corresponding to the trusted Java-AP software is transmitted to mobile unit 16 from one of IP server units 12-14. At this stage, in ADF of trusted Java-AP software are contained URL showing the location of the Jar file, URL showing the location of SDF corresponding to trusted Java-AP software, and the public key paired with the secret key which is used to encrypt SDF. Mobile unit 16 obtains SDF by using URL in ADF after receiving ADF, and decrypts SDF by using the public key in ADF. Then, mobile unit 16 finally obtains the Jar file by using URL of the Jar file contained in ADF. Hereinafter, when trusted Java-AP software is executed in mobile unit 16, the operation of trusted Java-AP is restricted on the basis of SDF. This is one characteristic of the present embodiment. As shown in FIG. 1, transmission of SDF is carried out via mobile packet communication network 15, and administering server unit 18 and gateway server unit 17, which are connected by an exclusive line.

Hereinafter, with regard to the relevant characteristics, the configuration of each element of the transmission system will be explained.

IP server units 12, 13 and 14 are equipped with fixed memory 12A, 13A and 14A respectively.

Fixed memory 12A, 13A and 14A are fixed memories such as a hard disc, and store Java-AP software constituting Jar files and ADF, and explanatory files on the content of Java-AP software for users of mobile units.

Each Java-AP software stored in fixed memory 12A, 13A and 14A might be either trusted Java-AP software or non-trusted Java AP software. Whether Java-AP is trusted Java-AP or non-trusted Java-AP, in each ADF of Java-AP software, information such as a package URL showing the location where a Jar file in WWW is stored, information showing the size of the Jar file, and information showing the date of the most recent update are written. Such information is generally known as items to be written in ADF of a Java-AP software. Also, ADF of trusted Java-AP software, as shown in FIG. 2, contains APID of trusted Java-AP, the hash value of the Jar file, URL showing the location where SDF is stored in WWW (hereinafter, referred to as SDF-URL), and the public key paired with the secret key used for encrypting SDF. At this stage, the public key is issued to a communication provider whose authenticity is certified by CA (Certifying Agent) as a certificate.

Also, the explanatory file is a text file written in accordance with HTML. A mobile unit, when a certain Java-AP software is downloaded, needs to download beforehand, the explanatory file corresponding to the Java-AP software. The explanatory file contains information for forming UI (User Interface) for receiving from the user the command for downloading Java-AP software. Mobile unit 16 displays the UI screen in accordance with the information. The user can carry out the operation on mobile unit 16 for specifying the object showing the desired Java-AP on the UI screen. The explanatory file is written for the object specified by the user in this manner so as to correspond to the URL showing where in WWW, ADF corresponding to Java-AP software, which is the object for downloading, is located.

Each of IP server units 12 to 14 is equipped with the function of producing and updating each of the above-mentioned files in accordance with the command of an IP.

Administering server unit 18 is equipped with fixed memory 18A such as a hard disc. Administering server unit 18 establishes a TCP connection with the party. When administering server unit 18 receives a request message which uses the GET method of HTTP from the party via a TCP connection, administering server unit 18 reads out the file identified by URL specified by GET method from fixed memory 18A, and returns a response message of HTTP containing the file, and severs the connection.

Also, in the above-mentioned fixed memory 18A are stored, list file 200 for introducing to the user of mobile unit 16 downloadable Java-AP software, and respective SDF corresponding to each Java-AP software which is listed in list file 200.

SDF has already been explained by referring to FIG. 3.

List file 200, is a text file written in accordance with HTML. As already explained, the mobile unit, when it needs to download certain Java-AP software, needs to obtain the explanatory file relating to the Java-AP software. As already explained, mobile unit 16 can obtain the explanatory file directly by accessing the IP server unit in which the explanatory file is stored. However, in the present embodiment, mobile unit 16 can obtain the explanatory file of the desired Java-AP software also by the following process as opposed to the above-mentioned direct method. First, mobile unit 16, by accessing administering server unit 18, obtains list file 200, and displays UI screen accordingly. The user can carry out the operation on mobile unit 16 to specify the object showing the desired Java-AP on UI screen. List file 200 matches the object specified by the user to URL showing the location of the explanatory file of Java-AP software in WWW, which is the object of downloading. Mobile unit 16, by using URL obtained via list file 200, obtains the explanatory file from the IP server unit.

Figure 5:
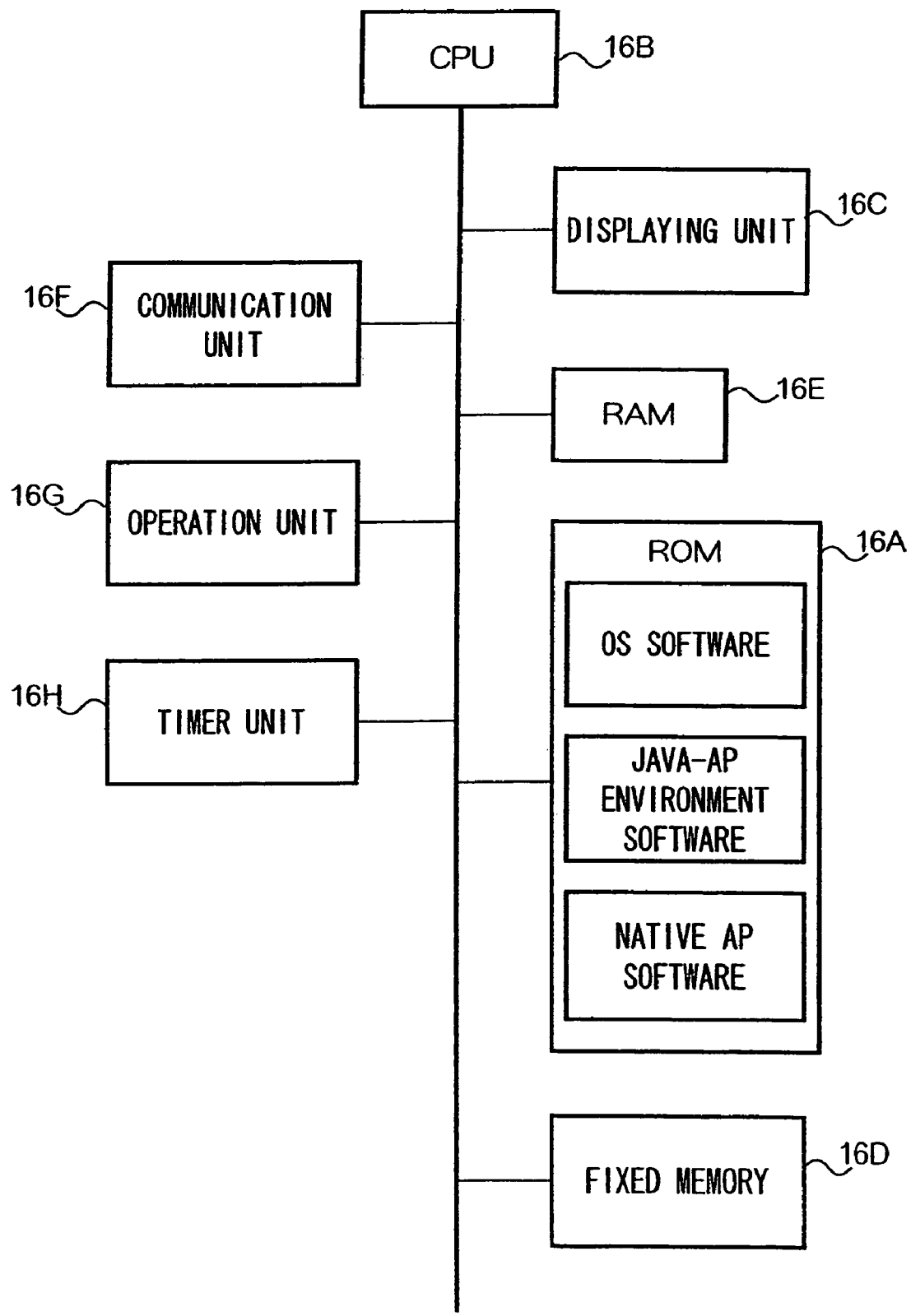
FIG. 5 is a block diagram showing the configuration of a mobile unit constituting the system.

Mobile unit 16 consists of, as shown in FIG. 5, OS (Operating System) software; ROM 16A in which Java-AP environment software for establishing the environment for executing Java-AP, and several types of native AP software are stored; CPU 16B which is connected to ROM 16A for reading out a program from ROM 16A and executing the program; displaying unit 16C which is connected to CPU 16B; fixed memory 16D; RAM 16E; communication unit 16F; and operation unit 16G.

Displaying unit 16C has, for example, a liquid crystal displaying panel, and displays data provided by CPU 16B as an image. Fixed memory 16D is, for example, SRAM or EEPROM, and data is read and written by CPU 16B. Fixed memory 16D is used to store Java-AP software downloaded from a server unit (hereinafter, referred to as a Web server unit) constituting WWW, and SDF. As already explained, in the present embodiment, the expression "Java-AP software" is used to refer to both "trusted Java-AP software" and "non-trusted Java-AP software." However, in a certain context, the expression "Java-AP software" may refer to "trusted Java-AP software." In such a context, the expression "Java-AP software" should be interpreted as a concept containing ADF, SDF, and Jar. Also, in a certain context, the expression "Java-AP software" may refer to "non-trusted Java-AP software." In such a context, the expression "Java-AP software" should be interpreted as a concept containing ADF and Jar.

Communication unit 16F performs radio packet communication with mobile packet communication network 15, and relays packets between CPU 16B and mobile packet communication network 15. Also, communication unit 16F is equipped with CODEC, a microphone, a speaker and so forth for communication besides an antenna or a radio transmission and reception unit. Hence, mobile unit 16, by communication unit 16F, can perform communication by circuit switching via a mobile communication network (not shown). Operation unit 16G is equipped with an operation controller, and provides CPU 16B a signal in accordance with the operation carried out by the operation controller. Timer unit 16H clocks the present date and time (hereinafter, merely referred to as the present date and hour). For timer unit 16H to clock the present date and hour more precisely, the present date and hour may be synchronized with the present date and hour notified periodically via a control channel by a base station of packet communication network 15 (not shown).

Figure 6:
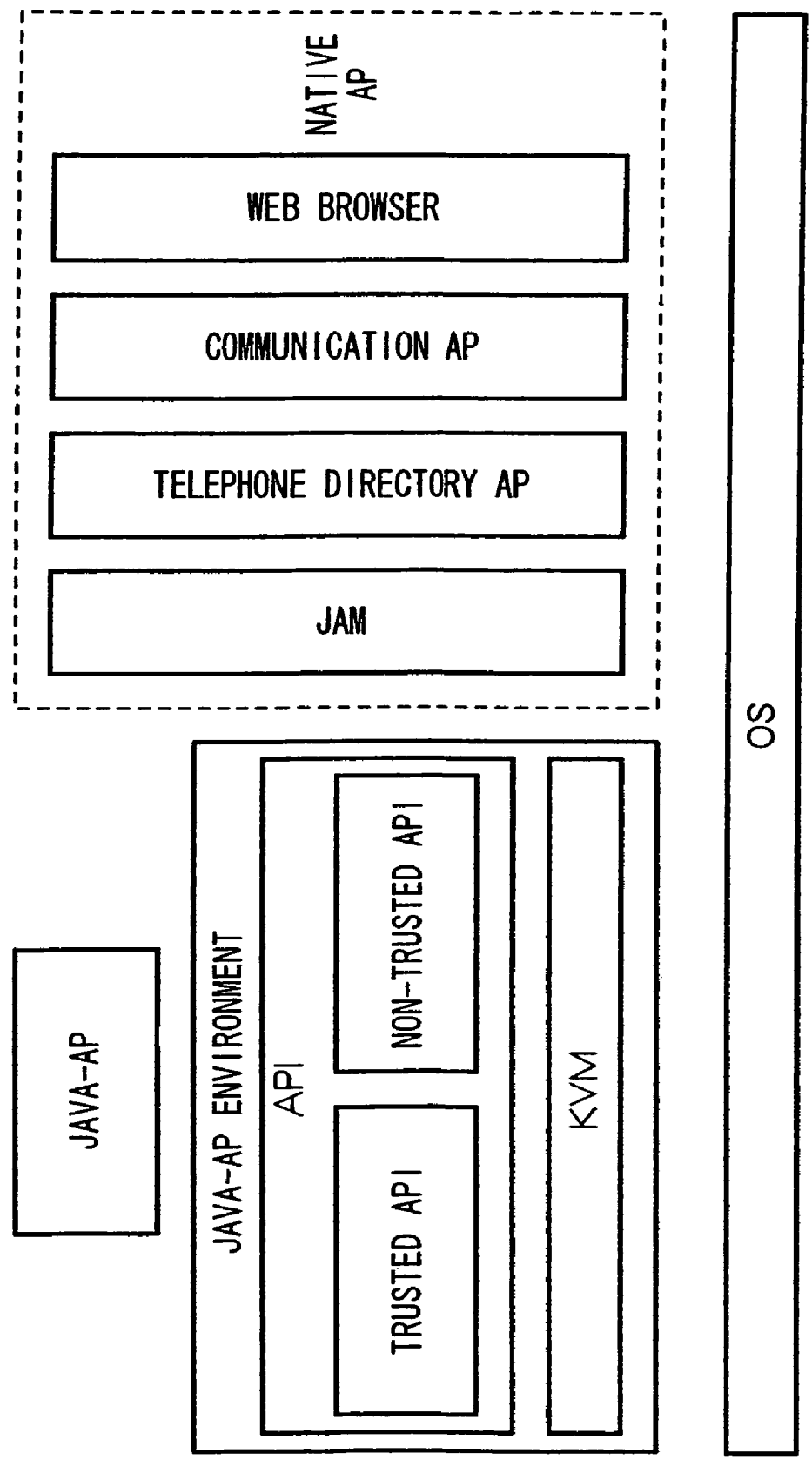
FIG. 6 is a conceptual figure showing the functional configuration of a mobile unit.

CPU 16B is a unit, which controls the entire mobile unit 16 in accordance with several kinds of programs stored in ROM 16A. When a switch (not shown) is turned on, CPU 16B reads out OS of FIG. 6 from ROM 16A and executes with RAM 16E as a work area. CPU 16 provides a function such as UI in accordance with OS. OS identifies the command of the user on the basis of the signal supplied by operation unit 16G and the status of UI, and carries out the process in accordance with the command.

When the command of the user requests activation of communication software, which is native AP software, OS activates the communication software, and executes communication AP in mobile unit 16. By using communication AP, the user can communicate with the party.

When the command of the user requests the activation of telephone directory AP, which is native AP software, OS activates the telephone directory software, and executes telephone directory AP in mobile unit 16. By using telephone directory AP, the user can refer to, use, and change the content of the telephone directory (hereinafter, referred to as telephone directory data) stored in fixed memory 16D.

When the command of the user requests the activation of Web browser software, which is native AP software, OS activates Web browser software, and executes the Web browser in mobile unit 16. The Web browser provides UI. Then, as the user gives the command by operating operation unit 16G, the Web browser identifies the command of the user on the basis of the status of UI and the signal provided by operation unit 16G, and executes the process in accordance with the command. For example, when the command is for obtaining the specified file from WWW, a TCP connection is established by operating communication unit 16F with the Web server unit in which the file is stored, a request message of HTTP using the GET method is transmitted by URL showing the specified location, a response message corresponding to the request message is received, and the connection is severed. Furthermore, the Web browser interprets the file contained in the received response message in accordance with HTML, produces UI containing the Web page, and provides the user. Also, when a user sends a command for downloading Java-AP software, Web browser notifies the command to JAM (Java Application Manager). Specifically, in a Web page, either by clicking or pressing, when an anchor tag to which the object tag is specified is designated, the Web browser extracts URL which is specified as data property of the object tag, and notifies JAM that downloading of Java-AP software by URL is requested.

When the command of the user requests the activation of JAM software, which is native AP software, OS activates JAM software, and executes JAM in mobile unit 16. JAM shows to the user a list of Java-AP software installed in mobile unit 16, and activates the Java-AP software specified by the user. Specifically, when the command of the user to JAM requests the activation of Java-AP software, Java-AP environment software is activated, and Java-AP environment is executed in mobile unit 16. Then, the specified Java-AP software is activated, and Java-AP is executed in Java-AP environment. Java-AP environment contains KVM, which is a lightweight Java Virtual Machine appropriate to a cellular terminal, and API provided for Java-AP. API provided for Java-AP is divided into trusted API which only Java-AP whose trustworthiness is guaranteed by the communication provider on the basis of the contract with the IP (hereinafter, referred to as trusted AP) is allowed to use, and non-trusted API which any Java-AP is allowed to use.

(2) Operation

Hereinafter, the operation of the present embodiment is explained.

(2-1) Download of Java-AP Software by Mobile Unit 16

Figure 7:
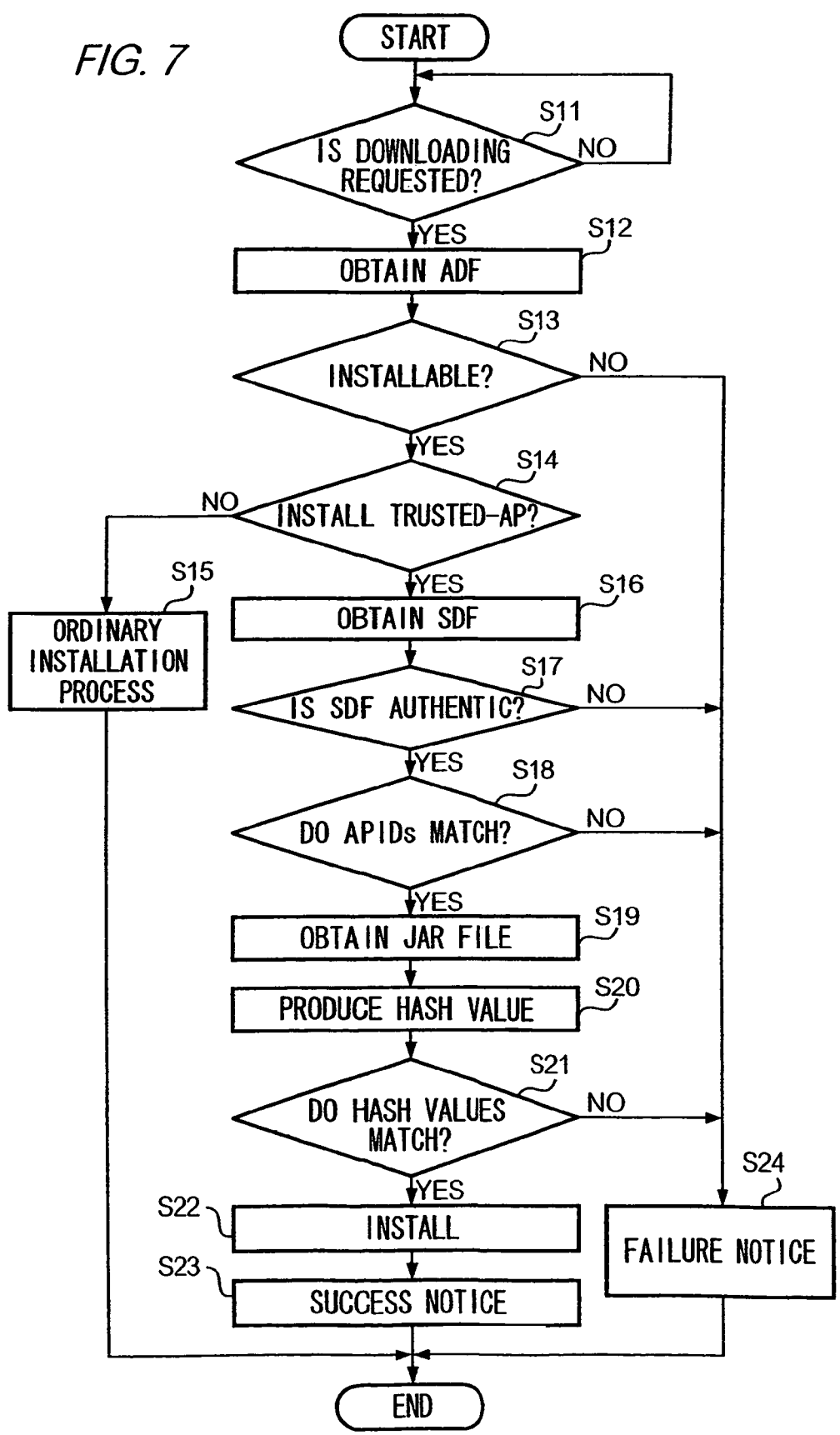
FIG. 7 is a flowchart showing the process of a mobile unit for downloading and installing Java-AP software.

JAM, when a command for requesting the downloading of Java-AP is notified by the Web browser, carries out the process for downloading and installing Java-AP software into mobile unit 16. The flow of the process is shown in FIG. 7. In FIG. 7, the process of mobile unit 16 for obtaining the explanatory file is omitted. Since different modes exist for the process of obtaining the explanatory file, the process will be later explained with specific examples of the operation. As shown in FIG. 7, JAM first determines whether downloading of Java-AP software is requested (Step S11). Then, when a command for requesting downloading of Java-AP software is notified from Web browser, ADF corresponding to the Java-AP software is obtained from any one of IP server units 12-14 (Step S12). More specifically, JAM establishes a TCP connection with any one of IP server units 12-14 in which ADF is stored, produces and transmits a request message requesting transmission of ADF, and severs the TCP connections after receiving a response message to the request message and obtaining ADF. Then, JAM writes ADF contained in the response message into fixed memory 16D.

Then, JAM determines whether Java-AP software, which is about to be downloaded, can be installed in mobile unit 16 on the basis of the content of ADF (Step S13). At this stage, whether installation is possible or not, may be determined on the same basis as a conventional basis such as comparison between the size of the Jar file written in ADF and the available volume in fixed memory 16D in which the Jar file can be stored.

At this stage, when installation is determined to be possible (Step S13; Yes), JAM determines whether Java-AP software, which is about to be downloaded, is trusted Java-AP software (Step S14). More specifically, JAM confirms whether SDF-URL is written in ADF obtained in Step S12, and determines that SDF corresponding to the Java-AP software exists when SDF-URL is written. In other words, JAM determines that Java-AP software is trusted Java-AP software. On the other hand, JAM determines that Java-AP software is non-trusted Java-AP software when SDF-URL is not written.

Then, when Java-AP software, which is about to be downloaded is determined to be non-trusted Java-AP (Step S14; No), the conventional processes for downloading and installation are carried out (Step S15).

On the other hand, when Java-AP software, which is about to be downloaded, is determined to be trusted Java-AP software (Step S14; Yes), JAM obtains SDF corresponding to the software from administering server unit 18 (Step S16). In other words, JAM establishes a TCP connection with administering server unit 18, produces and transmits a request message for requesting administering server unit 18 to transmit SDF stored in the location shown by SDF-URL written in ADF, and severs the above-mentioned connection after receiving a response message to the request message and obtaining. SDF.

As mentioned above, SDF corresponding to trusted Java-AP software contains APID, policy information, and the expiration date. SDF is further signed (encrypted) with the secret key of the communication provider. Then, JAM inspects (decrypts) the signature of SDF contained in the response message by using the public key extracted from ADF which has already been obtained, and determines the authenticity of SDF (Step S17). When the authenticity is confirmed (Step S17; Yes), JAM writes SDF into fixed memory 16D.

Then, JAM compares APID contained in SDF with APID contained in ADF, which has already been obtained, and determines whether the APIDs match (Step S18).

When the APIDs are determined to match (Step S18; Yes), JAM obtains the Jar file (Step S19). More specifically, JAM establishes a TCP connection with any one of IP servers 12-14 in which the Jar file identified by package URL contained in ADF is stored; produces and transmits a request message to request transmission of the Jar file; receives a response message to the request message; obtains the Jar file; and severs the TCP connection.

Then, JAM calculates the hash value of the Jar file obtained (Step S 20). Although any hash function can be used to calculate the hash value, the hash function used in mobile unit 16 and the hash function used to calculate the hash value contained in ADF must be identical. IP, which provides trusted Java-AP software actually calculates the hash value by the hash function used in mobile unit 16, and produces ADF.

JAM compares the hash value calculated and the hash value extracted from ADF, and when the hash values match (Step S21; Yes), writes the obtained Jar file into fixed memory 16D, carries out several kinds of processes relating to the installation of trusted Java-AP software (Step S22), and notifies to the user that the installation has succeeded (Step S23).

Hereinafter, JAM monitors the operation of trusted Java-AP when trusted Java-AP software is executed, and restricts the use of trusted API. The restriction is carried out in accordance with policy information in SDF stored in fixed memory 16D.

When Java-AP software is determined to be not installable (Step S13; No); SDF is determined to be not authentic (Step S17; No), APID of SDF and APID of ADF do not match (Step S18; No); or the hash value calculated and the hash value ADF has do not match (Step S21; No), JAM notifies to the user that the installation has failed, and returns the status of mobile unit 16 to that of Step S11 or that of before Step S11.

(2-2) Renewal of SDF by Mobile Unit 16

Trusted Java-AP software can be executed by mobile unit 16 until the expiration date contained in the corresponding SDF passes. When the expiration date needs to be renewed, mobile unit 16 needs to obtain new SDF from administering server unit 18. Hereinafter, the process of JAM for renewing the expiration whenever the expiration date in SDF is reached is explained by referring to the flow chart shown in FIG. 8.

Figure 8:
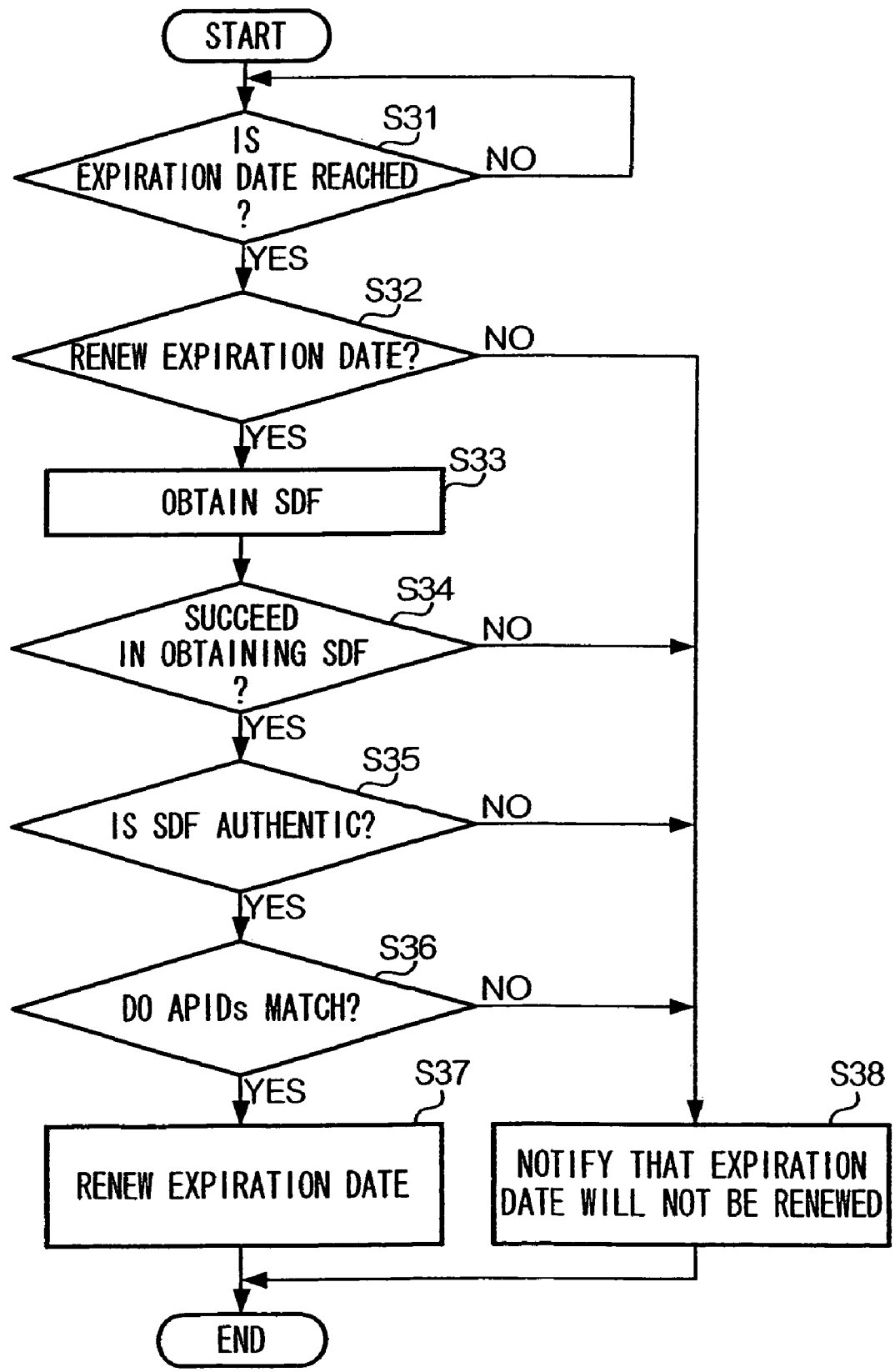
FIG. 8 is a flowchart showing the process of a mobile unit for renewing the expiration date of Java-AP software.

As shown in FIG. 8, JAM constantly monitors the present date and hour clocked by timer unit 16H in mobile unit 16 and a plurality of expiration dates each of which is extracted from all SDF obtained so far and stored in fixed memory 16D; and determines whether the expiration date is reached (Step S31).

When any one reaches the expiration date (Step S31; Yes), JAM displays a message on displaying unit 16C to ask the user whether to renew the expiration date along with the name of the Java-AP software whose expiration date is reached, and waits until the user carries out the necessary operation.

When the user commands to renew the expiration date, JAM interprets the content of the command (Step S32; Yes), and obtains SDF corresponding to the Java-AP software whose expiration date should be renewed, from administering server unit 18 (Step S33). More specifically, JAM refers to the memory content of fixed memory 16D; extracts SDF-URL contained in ADF which contains APID of the Java-AP software whose expiration date should be renewed; produces and transmits a request message to request administering server unit 18 the transmission of SDF stored in the location shown in SDF-URL; and severs the above-mentioned connection after receiving a response message to the request message and obtaining SDF.

Then, JAM determines whether SDF is obtained by using the above-mentioned SDF-URL (Step S34). At this stage, in a case that SDF cannot be obtained it is because the communication provider does not store SDF in the location shown by the above-mentioned SDF-URL in administering server 18; or because the communication provider wants to stop or discontinue the use of Java-AP software for a certain reason. The reason the use of Java-AP software needs to be stopped or discontinued could be due to circumstances pertaining to IP (for example, when transmitting software a user can try only for a certain period of time), or if the contract between IP and the communication provider has expired.

When JAM succeeds in obtaining SDF (Step S34; Yes), JAM inspects (decrypts) the signature of SDF by using the public key contained in ADF, which has already been obtained, and determines the authenticity of SDF (Step S35).

When the authenticity is confirmed (Step S35; Yes), JAM compares APID contained in SDF with APID contained in ADF which has already been obtained, and determines whether the APIDs match (Step S36). When the APIDs are determined to match (Step S36; Yes), JAM writes the obtained SDF over the previous SDF which has already been written into fixed memory 16D, and renews the expiration date in this manner.

In the instances when the expiration date is determined not to be renewed by the operation of the user (Step S32; No); when SDF cannot be obtained (Step S34; No); when SDF is determined to be not authentic (Step S35; No); or when APID of SDF and APID of ADF do not match (Step S36; No), JAM notifies to the user that the expiration date will not be renewed, and returns the status of mobile unit 16 to that of Step S31 or before.

(3) Specific Operation

Next, the operation of the above-mentioned system is explained.

In the operation explained below, establishment of the TCP connection and severing operation are general operations of HTTP; therefore, the explanation is omitted. Also, the above-mentioned operations carried out by OS, the Web browser, JAM, Java-AP, native AP and so forth are operations of mobile unit 16; therefore, in the following explanation, the main unit which carries out the operation is mobile unit 16.

Figure 9:
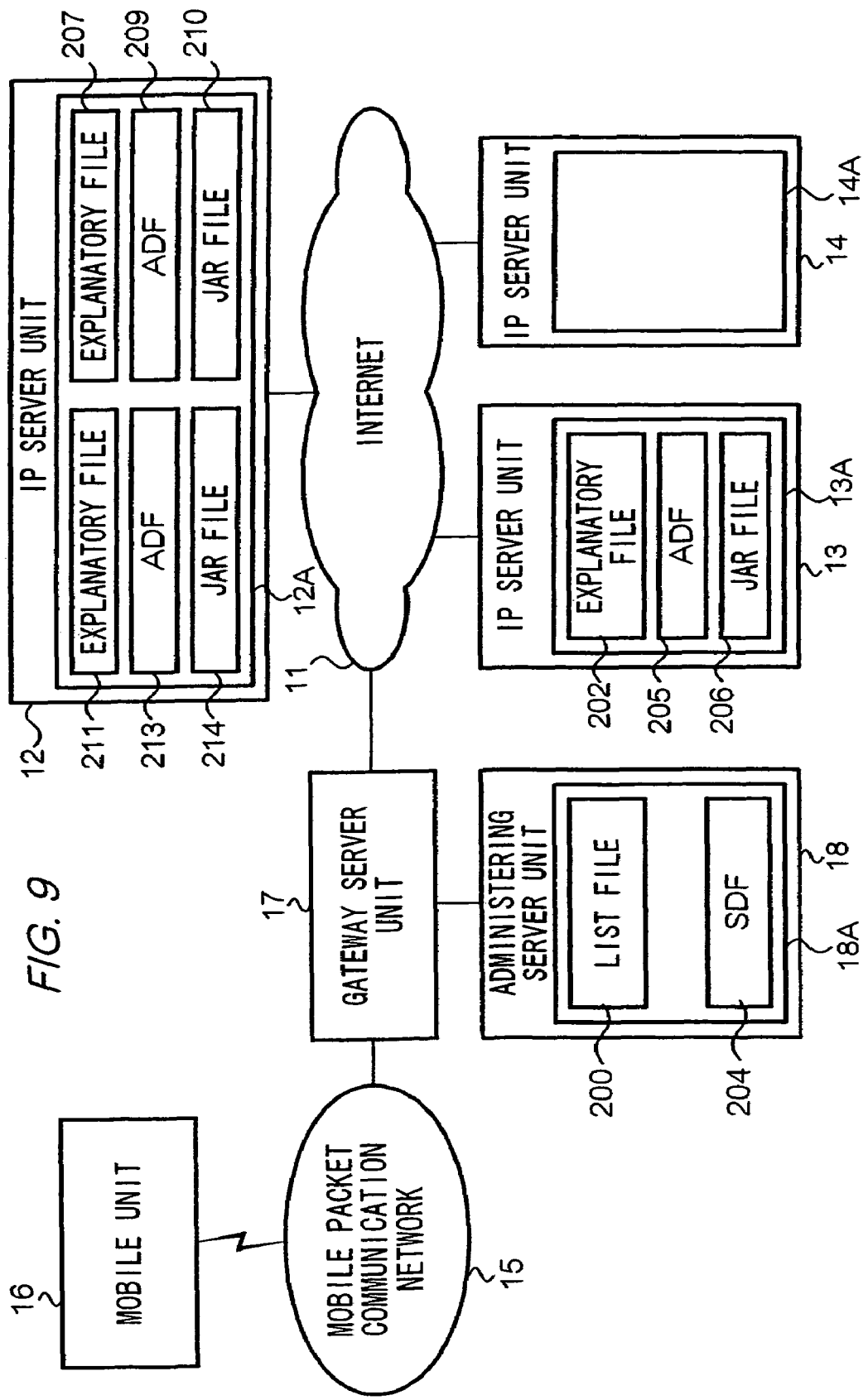
FIG. 9 is a block diagram for explaining the operation of the transmission system.

Also, as shown in FIG. 9, in fixed memory 18A of administering server unit 18, are stored list file 200 and SDF 204. List file 200 and SDF 204 are produced by the communication provider in accordance with the contract between IP, which administers IP server unit 13 and IP server unit 14, and the communication provider, which administers administering server unit 18.

Figures 10, 11:
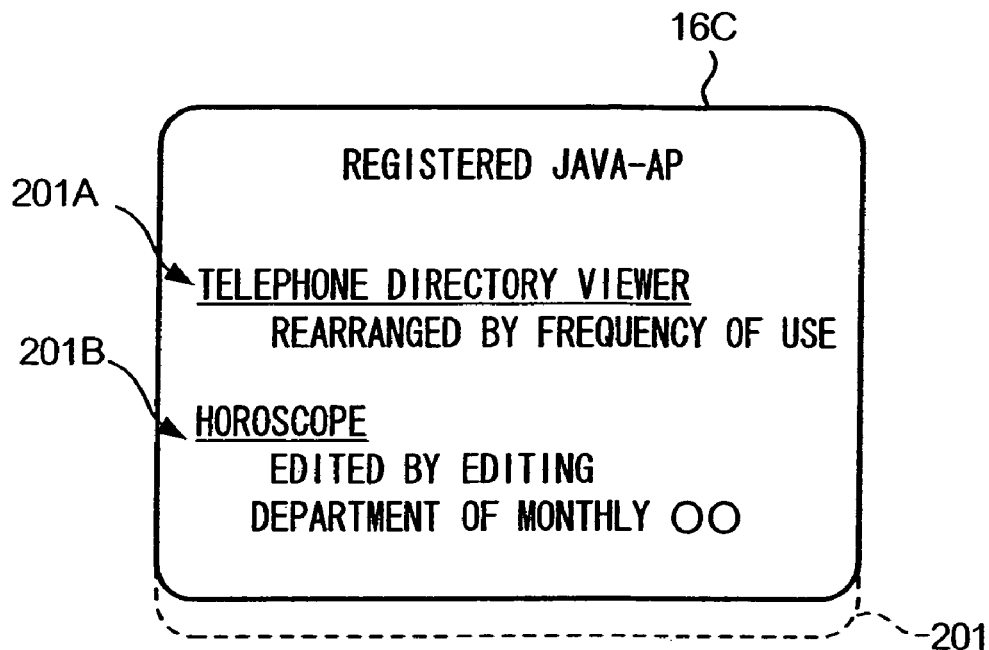
FIG. 10 is a diagram showing a list page transmitted in the transmission system.
FIG. 11 is a diagram showing the content of an explanatory file stored in an IP server unit constituting the transmission system.

At this stage, list file 200 is written to provide list page 201 shown in FIG. 10 when interpreted and executed by mobile unit 16. Also, list file 200 is written, when option 201A constituting list page 201 is hit (either by being clicked or pressed), to produce a request message containing URL of explanatory file 202 (will be explained later) ("http://www.main.bbb.co.jp/ghi.html") as a parameter of the GET method. Moreover, list file 200 is written, when option 201B constituting list page 201 is hit (either by being clicked or pressed), to produce a request message containing URL of explanatory file 207 (will be explained later) ("http://www.ccc.cojp/jkl.html") as a parameter of the GET method.

Also, SDF 204 contains "0001" as APID, information shown in FIG. 4 as policy information, and "10:00 AM of Oct. 1, 2002" as the expiration date which are signed by using the secret key of the communication provider.

Also, in fixed memory 12A of IP server unit 12, are stored explanatory file 211 corresponding to Java-AP software of the title "tsume-shogi" (hereinafter, referred to as the first non-trusted Java-JP software in the present embodiment), ADF 213, and Jar file 214. Explanatory file 211, ADF 213, and Jar file 214 are produced by IP administering IP server unit 12. With regard to these files, the content of explanatory file 211 is shown in FIG. 11, and explanatory file 211 is written to provide explanatory page 212 shown in FIG. 12 when interpreted and executed by mobile unit 16. Also, ADF 213 contains URL of Jar file 214 ("http://www.ccc.co.jp/shogi.jar") as package URL.

Figures 12, 13:
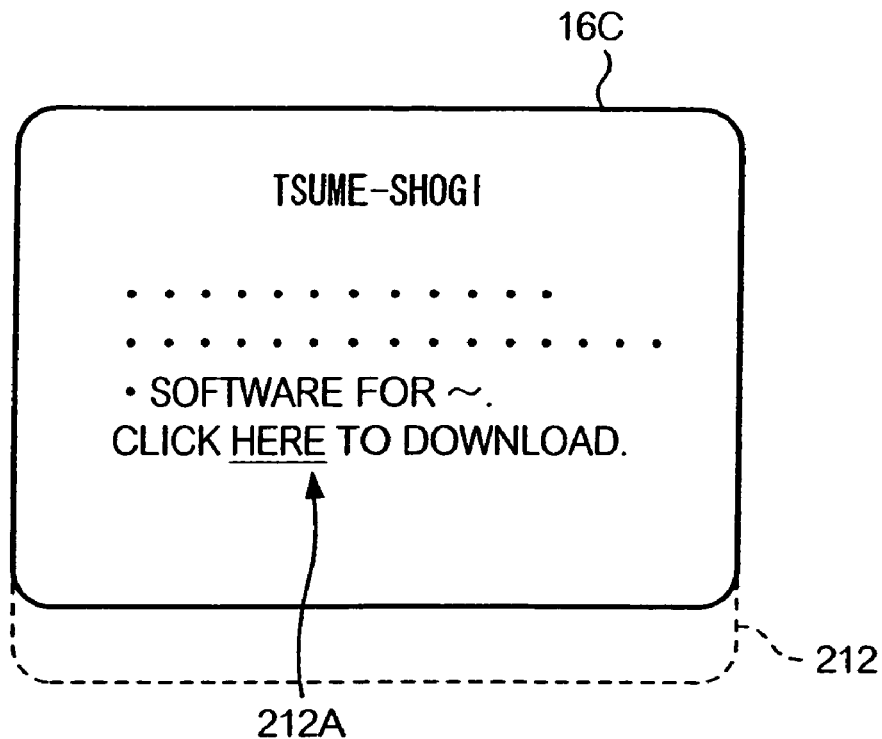
FIG. 12 is a diagram showing an explanatory page transmitted in the transmission system.
FIG. 13 is a diagram showing the content of an explanatory file stored in an IP server unit.

Also, in fixed memory 12A of IP server unit 12, are stored explanatory file 207 corresponding to Java-AP software of the title "horoscope" (hereinafter, referred to as the second non-trusted Java-AP software in the present embodiment), ADF 209, and Jar file 210. Explanatory file 207, ADF 209, and Jar file 210 are produced by IP administering IP server unit 12. With regard to these files, the content of explanatory file 207 is shown in FIG. 13, and explanatory file 207 is written to provide explanatory page 208 shown in FIG. 14 when interpreted and executed by mobile unit 16. Also, ADF 209 contains URL of Jar file 210 ("http://www.ccc.co.jp/horoscope.jar") as package URL.

The above-mentioned first non-trusted Java-AP software and the second non-trusted Java-AP software are different in that information on the second non-trusted Java-AP software is registered with list file 200, whereas information on the first non-trusted Java-AP software is not registered.

Figure 15:
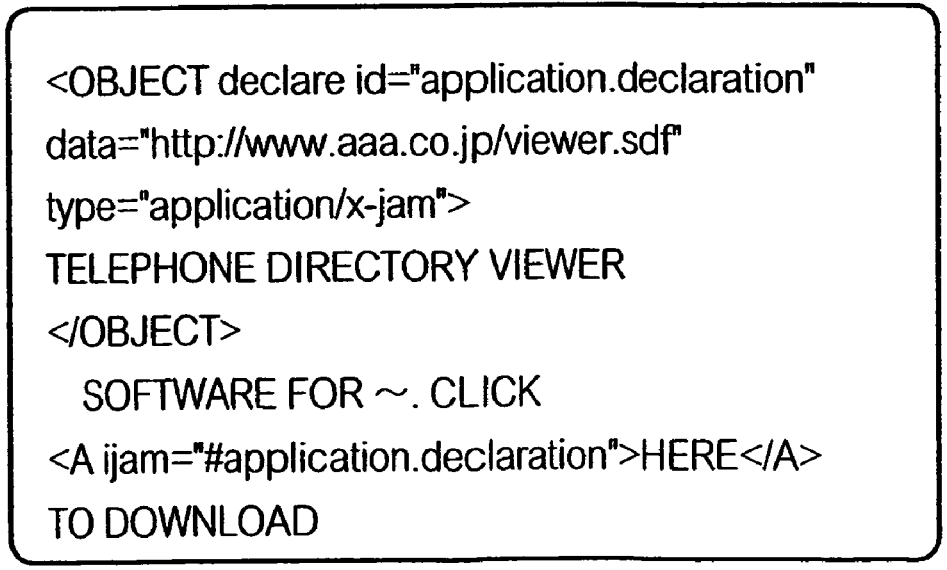
FIG. 15 is a diagram showing the content of an explanatory file stored in IP server unit 13 constituting the transmission system.

Also, in fixed memory 13A of IP server unit 13, are stored explanatory file 202 corresponding to Java-AP software of the title "telephone number directory viewer" (hereinafter, referred to as trusted Java-AP software in the present embodiment), ADF 205, and Jar file 206. Explanatory file 202, ADF 205, and Jar file 206 are produced by IP administering IP server unit 13 and IP server unit 14. With regard to these files, the content of explanatory file 202 is shown in FIG. 15, and explanatory file 202 is written to provide explanatory page 203 shown in FIG. 16 when interpreted and executed by mobile unit 16. ADF 205 contains "0001" as APID, the hash value of Jar file 206 as a hash value, URL of Jar file 206 ("http://www.main.bbb.co.jp/viewer.jar") as package URL, and URL of SDF 204 (http://www.aaa.co.jp/viewer.sdf") as SDF-URL, and the public key of the communication provider. Also, mobile unit 16 is in the status in which each of the above-mentioned Java-AP software can be installed.

(3-1) Installation Operation

First, the operation of installing Java-AP software in mobile unit 16 is explained with reference to each of the above-mentioned Java-AP software.

(3-1-1) First Non-Trusted Java-AP Software

Figure 17:
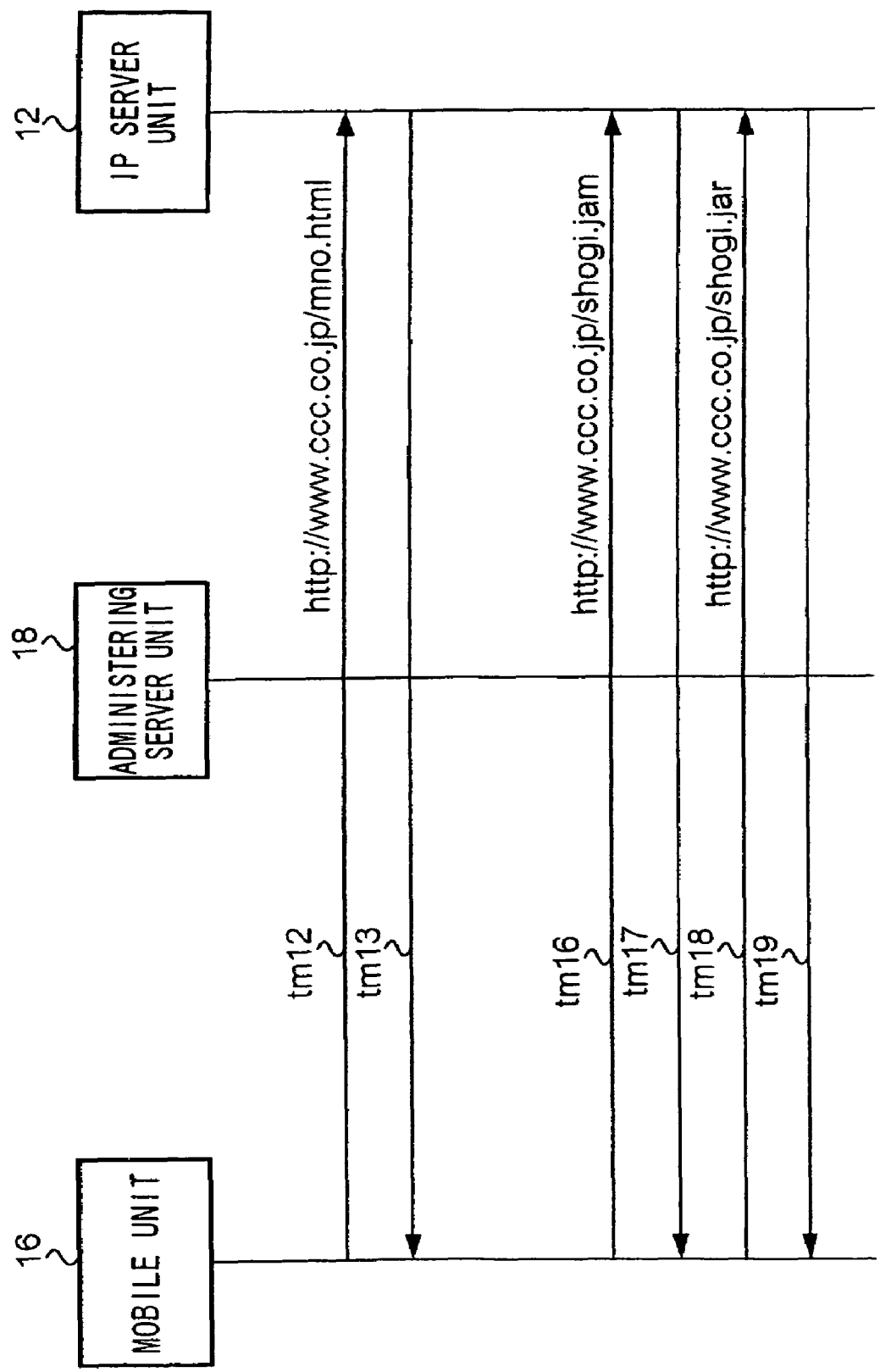
FIG. 17 is a sequence diagram for explaining the operation of the transmission system.

The installation operation of the first non-trusted Java-AP software begins when the user tries to obtain explanatory file 211 by operating mobile unit 16. As a result, in mobile unit 16, request message tm 12 containing URL of explanatory file 211 ("http://www.ccc.co.jp/mno.html") as a parameter of the GET method is produced. Request message tm 12 is, as shown in FIG. 17, transmitted by mobile unit 16, and is received by IP server unit 12.

In IP server unit 12, response message tm 13 containing explanatory file 211 is produced in response to the content of request message tm 12. Response message tm 13 is transmitted by IP server unit 12, and is received by mobile unit 16. In mobile unit 16, UI corresponding to the content of explanatory file 211 is provided to the user. As a result, in displaying unit 16C, explanatory page 212 shown, for example, in FIG. 12 is displayed.

When the user sees explanatory page 212, and operates mobile unit 16 to hit anchor 212A in explanatory page 212, the value specified as ijam property of the anchor tag written in explanatory file 211 of FIG. 11 (the tag which begins with "<A") identifies the object tag specified as id property (the tag which begins with "<OBJECT") in mobile unit 16. Then, URL specified as data property of the object tag ("http://www.ccc.co.jp/shogi.jam") is extracted, and request message tm 16 requesting transmission of ADF 213 identified by the URL is produced. Request message tm 16 is transmitted from mobile unit 16, and is received by IP server unit 12.

In IP server unit 12, response message tm 17 containing ADF 213 corresponding to the content of request message tm 16 is produced. Response message tm 17 is transmitted from IP server unit 12, and is received by mobile unit 16.

In mobile unit 16, on the basis of the content of ADF 213, whether the first non-trusted Java-AP software can be installed is determined. As mentioned above, since mobile unit 16 is in the status in which non-trusted Java-AP software can be installed, installation of the first non-trusted Java-AP software is determined to be possible in mobile unit 16.

Then, in mobile unit 16, ADF 213 is written into fixed memory 16D. Also, in mobile unit 16, package URL ("http://www.ccc.co.jp/shogi.jar") is extracted from ADF 213, and request message tm 18 requesting transmission of Jar file 214 identified by the package URL is produced. Request message tm 18 is transmitted by mobile unit 16, and is received by IP server unit 12.

In IP server unit 12, response message tm 19 containing Jar file 214 is produced in response to the content of request message tm 18. Response message tm 19 is transmitted by IP server unit 12, and is received by mobile unit 16. In mobile unit 16, Jar file 214 is written into fixed memory 16D in the status in which activation is possible, and installation of the first non-trusted Java-AP software is completed.

When the first non-trusted Java-AP software is determined as not installable in mobile unit 16, the status of mobile unit 16 returns to the status that existed before the acquisition of ADF 213 began.

(3-1-2) Second Non-Trusted Java-AP Software

The installation operation of the second non-trusted Java-AP software begins when the user tries to obtain explanatory file 207 or list file 200 by operating mobile unit 16. The operation, which begins by trying to obtain explanatory file 207 is a subset of the operation, which begins by trying to obtain list file 200; therefore, only the operation, which begins by trying to obtain list file 200 is explained hereinafter.

Figure 18:
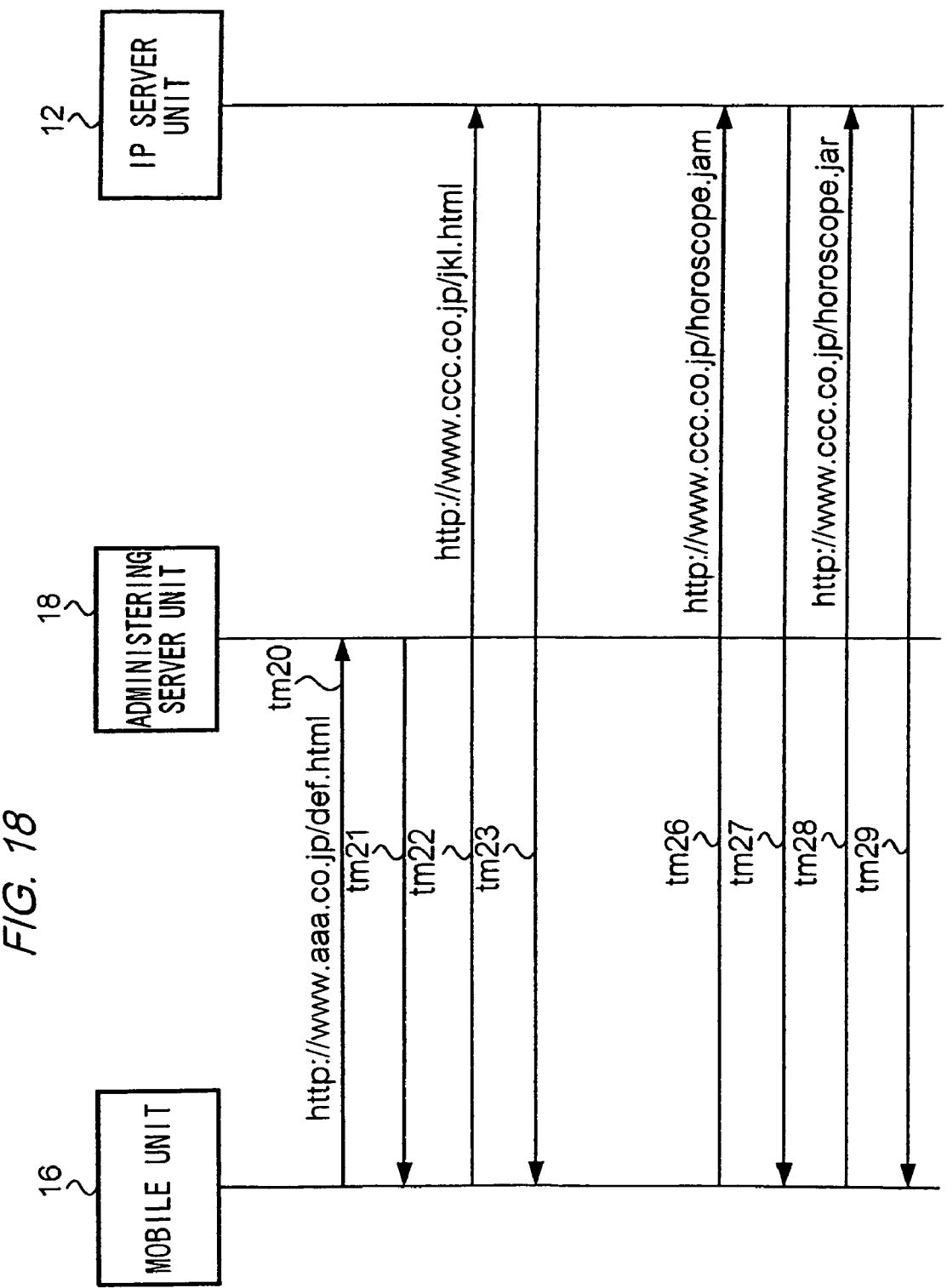
FIG. 18 is a sequence diagram for explaining the operation of the transmission system.

As shown in FIG. 18, in mobile unit 16, request message tm 20 containing URL of list file 200 ("http://www.aaa.co.jp/def.html") as a parameter of the GET method is produced. Request message tm 20 is transmitted by mobile unit 16, and is received by administering server unit 18.

In administering server unit 18, response message tm 21 containing list file 200 is produced in response to the content of request message tm 20. Response message tm 21 is transmitted by administering server unit 18, and is received by mobile unit 16. In mobile unit 16, when response message tm 21 is received, list file 200 in response message tm 21 is interpreted in accordance with HTML, and UI corresponding to the content of list file 200 is provided to the user of mobile unit 16. As a result, in displaying unit 16C of mobile unit 16, list page 201 shown, for example, in FIG. 10 is displayed.

When the user, after seeing list page 201, operates mobile unit 16 to hit option 201B in list page 201, request message tm 22 containing URL ("http://www.ccc.co.jp.jkl.html") corresponding to option 201B as a parameter of the GET method is produced. Request message tm 22 is transmitted by mobile unit 16, and is received by IP server unit 12.

Figure 14:
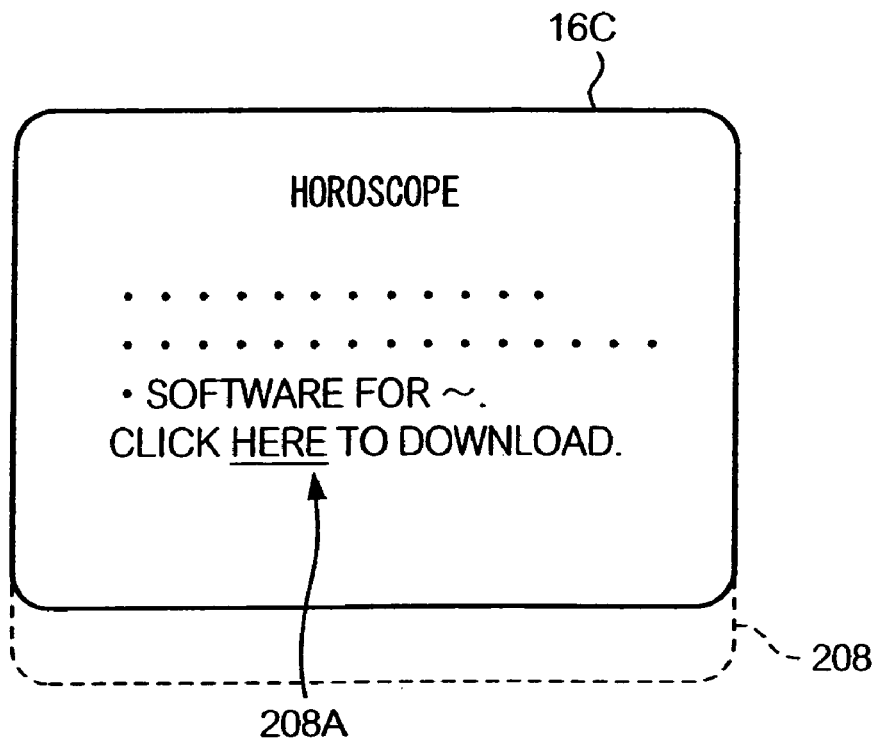
FIG. 14 is a diagram showing an explanatory page transmitted in the transmission system.

In IP server unit 12, response message tm 23 containing explanatory file 207 is produced in response to the content of request message tm 22. Response message tm 23 is transmitted by IP server unit 12, and is received by mobile unit 16. In mobile unit 16, UI corresponding to the content of explanatory file 207 is provided to the user. As a result, in displaying unit 16C, explanatory page 208 shown, for example, in FIG. 14 is displayed.

When the user, after seeing explanatory page 208, operates mobile unit 16 to hit anchor 208A in explanatory page 208, the value specified as ijam property of the anchor tag written in explanatory file 207 of FIG. 13 (the tag which begins with "<A") identifies the object tag specified as id property (the tag which begins with "<OBJECT"). Then, URL specified as data property of the object tag ("http://www.ccc.co.jp/horoscope.jam") is extracted, and request message tm 26 requesting transmission of ADF 209 identified by the URL is produced. Request message tm 26 is transmitted by mobile unit 16, and is received by IP server unit 12.

In IP server unit 12, response message tm 27 containing ADF 209 corresponding to the content of request message tm 26 is produced. Response message tm 27 is transmitted by IP server unit 12, and is received by mobile unit 16.

In mobile unit 16, on the basis of the content of ADF 209, whether the second non-trusted Java-AP software can be installed is determined. As mentioned above, since mobile unit 16 is in the status in which the second non-trusted Java-AP software can be installed, the second non-trusted Java-AP software is determined as installable in mobile unit 16.

Next, in mobile unit 16, ADF 209 is written into fixed memory 16D. Also, in mobile unit 16, package URL ("http://www.ccc.co.jp/horoscope.jar") is extracted from ADF 209, and request message tm 28 requesting transmission of jar file 210 identified by package URL is produced. Request message tm 28 is transmitted by mobile unit 16, and is received by IP server unit 12.

In IP server unit 12, response message tm 29 containing Jar file 210 in response to the content of request message tm 28 is produced. Response message tm 29 is transmitted by IP server unit 12, and is received by mobile unit 16. In mobile unit 16, Jar file 210 is written into fixed memory 16D, and installation of the second Java-AP software is completed.

When the second Java-AP software is determined as not installable in mobile unit 16, the status of mobile unit 16 returns to a previous status, that which existed before the acquisition of ADF 209 began.

(3-1-3) Trusted Java-AP Software

The installation operation of the trusted Java-AP software begins when the user tries to obtain explanatory file 202 or list file 200 by operating mobile unit 16. The operation, which begins by trying to obtain explanatory file 202 is a subset of the operation, which begins by trying to obtain list file 200; therefore, the operation, which begins by trying to obtain explanatory file 202 is omitted.

Figure 19:
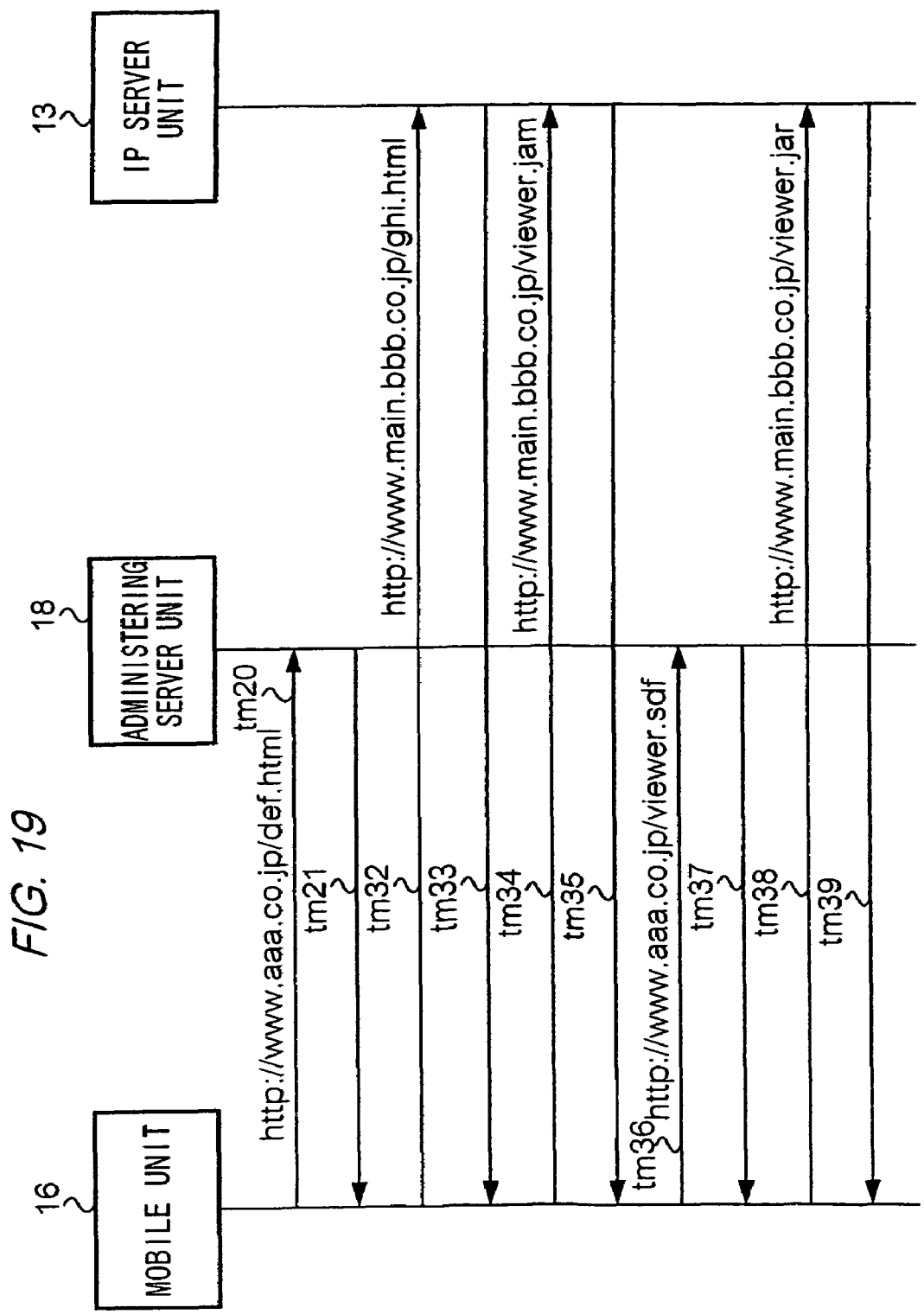
FIG. 19 is a sequence diagram for explaining the operation of the transmission system.

As shown in FIG. 19, in the operation which begins by trying to obtain list file 200, an operation identical to the operation shown in FIG. 18 is carried out till list page 201 shown, for example, in FIG. 10 is displayed after mobile unit 16 receives response message tm 21. When the user, after seeing list page 201, operates mobile unit 16 to hit option 201 A in list page 201, request message tm 32 containing URL corresponding to option 201A ("http://www.main.bbb.co.jp/ghi.html") as a parameter of the GET method is produced in mobile unit 16. Request message tm 32 is transmitted by mobile unit 16, and is received by IP server unit 13.

Figure 16:
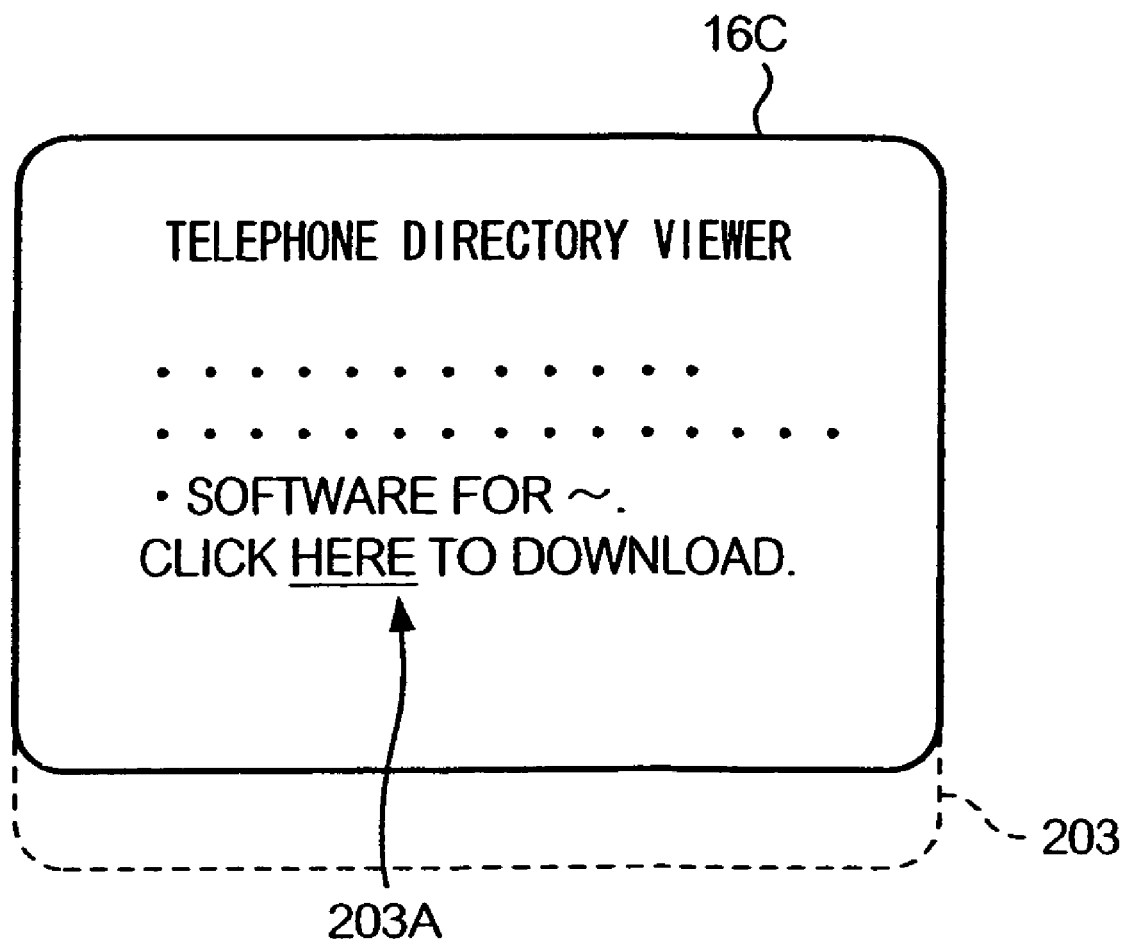
FIG. 16 is a diagram showing an explanatory page transmitted in the transmission system.

In IP server unit 13, response message tm 33 containing explanatory file 202 in response to the content of request message tm 32 is produced. Response message tm 33 is transmitted by IP server unit 13, and is received by mobile unit 16. In mobile unit 16, the user is provided with UI corresponding to the content of explanatory file 202. As a result, in displaying unit 16C, explanatory page 203 shown, for example, in FIG. 16 is displayed.

When the user, after seeing explanatory page 203, operates mobile unit 16 to hit anchor 203A in explanatory page 203, the value specified as ijam property of the anchor tag written in explanatory file 202 in FIG. 15 (the tag which begins with "<A") identifies the object tag specified as id property (the tag which begins by "<OBJECT"). Then, URL specified as data property of the object tag ("http://www.main.bbb.co.jp/viewer.jam") is extracted, and request message tm 34 requesting transmission of ADF identified by the URL is produced. Request message tm 34 is transmitted from mobile unit 16, and is received by IP server unit 13. In IP server unit 13, response message tm 35 containing ADF 205 corresponding to the content of request message tm 34 is produced. Response message tm 35 is transmitted from IP server unit 13, and is received by mobile unit 16 via gateway server unit 17 and mobile packet communication network 15.

In mobile unit 16, ADF 205 is written into fixed memory 16D, and whether trusted Java-AP software is installable is determined on the basis of the content of ADF 205. As mentioned above, since mobile unit 16 is in the status in which trusted Java-AP software is installable, trusted Java-AP software is determined to be installable in mobile unit 16.

Then, in mobile unit 16, request message tm 36 requesting transmission of SDF 204 identified by SDF-URL "http://www.aaa.co.jp/viewer.sdf" contained in ADF 205 is produced. Request message tm 36 is transmitted from mobile unit 16, and is received by administering server unit 18.

In administering server unit 18, response message tm 37 containing SDF 204 corresponding to the content of request message tm 36 is produced. Response message tm 37 is transmitted from administering server unit 18, and is received by mobile unit 16 via gateway server unit 17 and mobile packet communication network 15. At this stage, the communication path between administering server unit 18 and gateway server unit 17 is an exclusive line, and SDF 204 cannot be falsified until SDF 204 is received by mobile unit 16 since gateway server unit 17 is directly connected to mobile packet communication network 15 whose security is assured.

Further, in mobile unit 16, the authenticity of SDF 204 is determined by using the public key contained in ADF 205. As mentioned above, the public key contained in ADF 205 corresponds to the secret key used for signing SDF 204; therefore, SDF 204 is determined to be authentic as long as the content of SDF 204 is not changed in administering server unit 18.

When SDF 204 is determined to be authentic, in mobile unit 16, APID contained in ADF 205 and APID contained in SDF 205 are compared. As mentioned above, since APID, which corresponds to APID in SDF 204 is specified to be written in ADF 205 in IP server unit 13, APID contained in ADF 205 and APID contained in SDF 204 match as long as no mistakes exist in description and so forth. Then, in mobile unit 16, SDF 204 is written into fixed memory 16D.

Next, in mobile unit 16, package URL (http://www.main.bbb.co.jp/viewer.jar) is extracted from ADF 205, and request message tm 38 requesting transmission Jar file 206 identified by the package URL is produced. Request message tm 38 is transmitted from mobile unit 16, and is received by IP server unit 13.

In IP server unit 13, response message tm 39 containing Jar file 206 corresponding to the content of request message tm 38 is produced. Response message tm 39 is transmitted from IP server unit 13, and is received by mobile unit 16.

Then, in mobile unit 16, the hash value is calculated by using the hash function of Jar file 206 and the specified hash function, and the calculated hash value and the hash value contained in ADF 205 are compared. As mentioned above, since the hash value of the Jar file corresponding to ADF 205 is specified to be written into ADF 205, the hash values match as long as no mistakes exist in description and so forth.

When the hash values match, in mobile unit 16, Jar file 206 is written into fixed memory 16D in the status in which activation is possible, and installation of trusted Java-AP software is completed.

When SDF 204 is determined to be not authentic in mobile unit 16; APID contained in ADF 205 and APID contained in SDF 204 do not match; trusted Java-AP software is determined to be not installable; or the hash value calculated and the hash value contained in ADF 205 do not match, the status of mobile unit 16 returns to that existing before the acquisition of SDF 205 begins.

(3-2) Operation of Mobile Unit 16 when Java-AP Software is Activated

Next, the operation of mobile unit 16 when each of the above-mentioned Java-AP software is activated will be explained.

(3-2-1) Operation of Non-Trusted Java-AP Software

The operation of mobile unit 16, when non-trusted Java-AP software (including both the first non-trusted Java-AP software (tsume-shogi) and the second non-trusted Java-AP software (horoscope)) installed in mobile unit 16 by the above-mentioned installation operation is activated in mobile unit 16 in which JAM is achieved, and the functions corresponding to the software (hereinafter, referred to as non-trusted Java-AP) are achieved in mobile unit 16 will be explained.

When API, which non-trusted Java-AP is about to use is non-trusted API, the use of API in this case is approved by JAM since non-trusted API is allowed to use any Java-AP as mentioned above. Hence, non-trusted Java-AP can use non-trusted API.

On the other hand, when API, which non-trusted Java-AP is about to use is trusted API, JAM checks whether SDF corresponding to the Java-AP is stored in fixed memory 16D. At this stage, since such SDF is not stored in fixed memory 16D, JAM forbids the use of the API by the non-trusted Java-AP. Hence, non-trusted first Java-AP will not be able to use trusted API.

(3-2-2) Operation of Trusted Java-AP Software

The operation of mobile unit 16 when the installed trusted Java-AP software (telephone directory viewer) is activated in mobile unit 16 in which JAM is achieved, and the functions corresponding to the software are achieved in mobile unit 16, will be explained.

When API, which trusted Java-AP is about to use is non-trusted API, the use of the API obviously is approved by JAM as mentioned above. Therefore, trusted Java-AP can use non-trusted API.

When the API which trusted Java-AP is about to use is trusted API, the use of the API can be approved by JAM since SDF corresponding to the Java-AP is stored in fixed memory 16D but the operation of trusted Java-AP depends upon policy information in SDF. Hereinafter, the operation is explained for each API to be used.

(3-2-2-1) getPhoneList( )

Since "getPhoneList( )" is trusted API, whether the API can be used is determined by JAM on the basis of policy information in SDF 204 stored in fixed memory 16D. The content of the policy information is the content shown in FIG. 4; therefore, the use of "getPhoneList( )" is approved by JAM. Hence, trusted Java-AP (telephone directory viewer) can use "getPhoneList( )". In other words, trusted Java-AP can read out telephone number directory data.

(3-2-2-2) getCallHistory( )

Since "getCallHistory( )" is trusted API, whether the API can be used is determined by JAM on the basis of policy information in SDF 204. Since the content of the policy information is the content shown in FIG. 4, the use of "getCallHistory( )" is forbidden by JAM. Hence, trusted Java-AP (telephone directory viewer) cannot use "getCallHitory( )". In other words, trusted Java-AP cannot read out history data of transmission and reception.

(3-3) Operation of Renewing Expiration Date of Trusted Java-AP Software

Next, an example of the operation for renewing the expiration date of trusted Java-AP software is explained. In the explanation below, in FIG. 9, SDF 204 has been replaced by SDF 204a. However, the file is renewed only in that the expiration date is changed from "10:00 AM Oct. 1, 2002" to "10:00 AM Jan. 1, 2003", but the storage location, the file names, the secret keys used as signatures for SDF 204 and SDF 204a are not changed.

Figure 20:
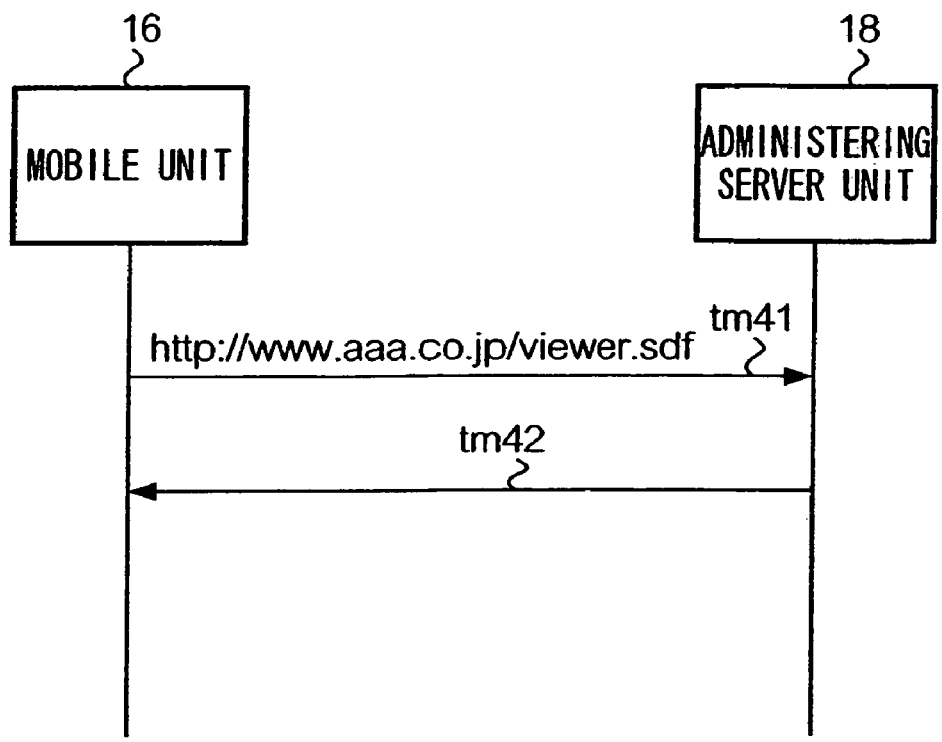
FIG. 20 is a sequence diagram for explaining the operation of the transmission system.

Mobile unit 16 constantly monitors the present date and hour clocked by timer unit 16H and a plurality of expiration dates contained in each SDF obtained so far, and determines whether the expiration date is reached. At this stage, when the present date and hour clocked by timer unit 16H becomes 10:00 AM of Oct. 1, 2002, the expiration date of trusted Java-AP software (telephone directory viewer) corresponding to APID "0001" is reached, and the operation shown in FIG. 20 begins as a result.

Figure 21:
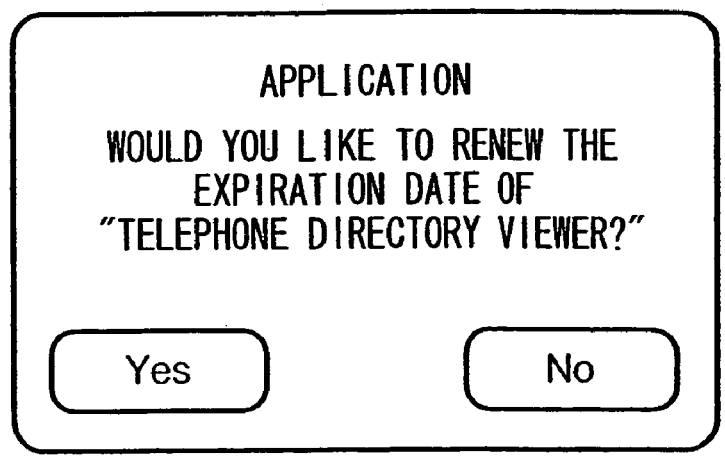
FIG. 21 is a diagram showing an image displayed in a mobile unit.

First, mobile unit 16, as shown in FIG. 21, displays a message on displaying unit 16c to ask the user whether to renew the expiration date since expiration date is reached along with the name of trusted Java-AP software "telephone directory viewer" whose expiration date is reached, and waits until the user operates.

At this stage, when the user carries out the operation to renew the expiration date, mobile unit 16 interprets the content of the command, and produces request message tm 41 as a parameter of GET Method containing SDF-URL (http://www.aaa.co.jp/viewer.sdf) contained in ADF which contains APID "0001." Request message tm 41 is transmitted from mobile unit 16, and is received by administering server unit 18.

In administering server unit 18, response message tm 42 containing SDF 204*a* corresponding to the content of request message tm 41 is produced. Response message tm 42 is transmitted from administering server unit 18, and is received by mobile unit 16.

On the other hand, mobile unit 16 determines whether SDF 204*a* is obtained by using the above-mentioned SDF-URL. At this stage, the process proceeds to the next stage since the success in obtaining SDF 204*a* is assumed. Then mobile unit 16 inspects (decrypts) the signature of SDF 204*a* by using the public key contained in ADF 205, which has already been obtained, and determines the authenticity of SDF 204*a*. When the authenticity is confirmed (Step S35; Yes), mobile unit 16 compares APID extracted from SDF 204*a* with APID contained in ADF 205, which has already been obtained, and determines whether the APIDs match.

At this stage, the APIDs should match; hence, mobile unit 16 writes SDF 204*a* over SDF 203 stored in fixed memory 16D, and the expiration date of trusted Java-AP software (telephone directory viewer) "10:00 AM Oct. 1, 2002" is replaced by "10:00 AM Jan. 1, 2003" in this manner.

In the instance when the expiration date is determined not to be renewed by the operation of the user; when SDF cannot be obtained; or SDF is determined to be not authentic; and when APID of SDF and APID of ADF do not match, JAM notifies to the user that the expiration date is not renewed, and returns the status of mobile unit 16 to that which existed before SDF 203*a* is obtained.

(3-4) Operation of Trusted Java-AP Software after Change

Figure 22:
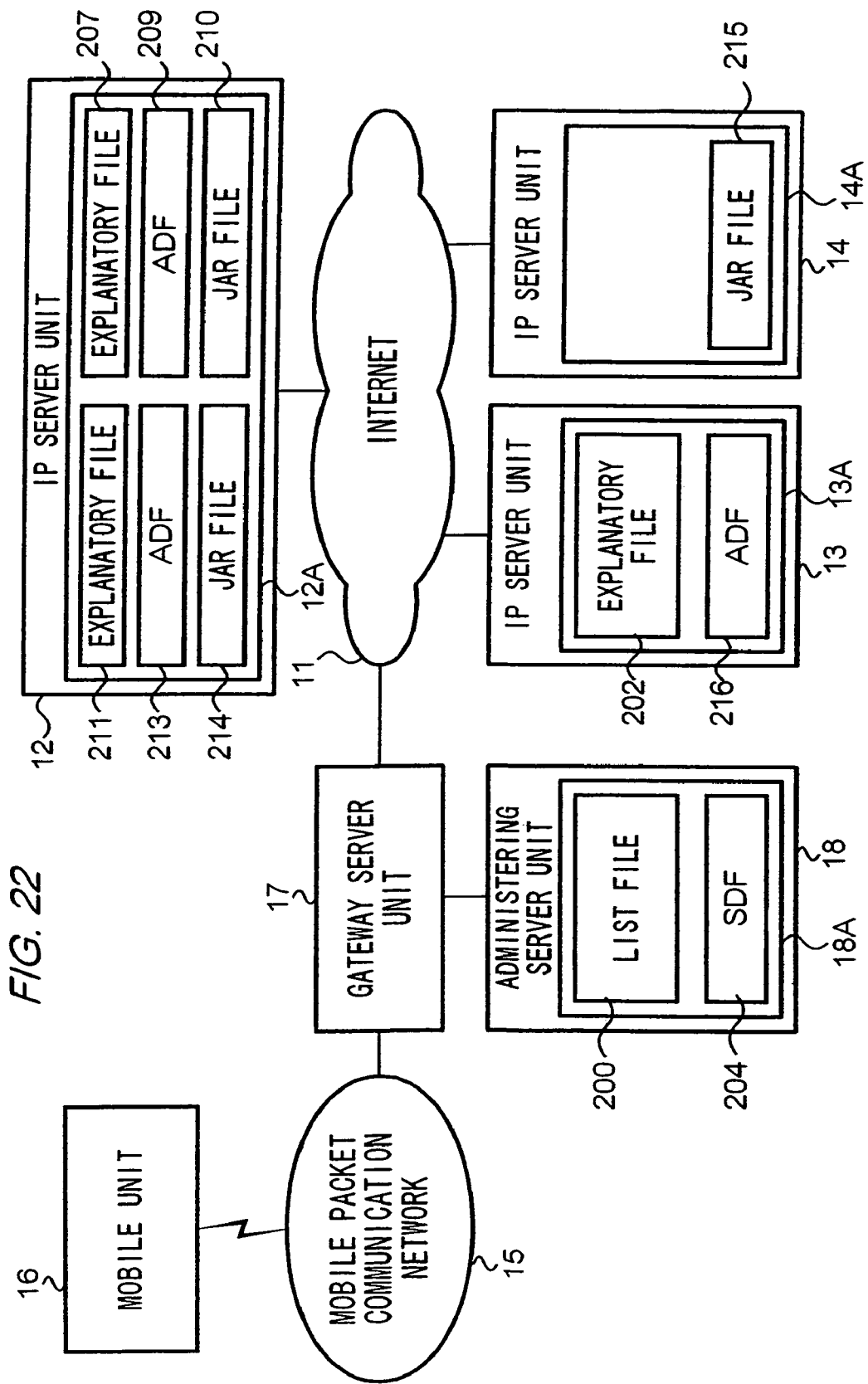
FIG. 22 is a block diagram for explaining another operation of the transmission system.

Next, the operation of the present system after IP, which administers IP server unit 13 and IP server unit 14 changes the transmission mode or the content of trusted Java-AP software will be explained. However, the present change includes the change of the content of Jar file 206 for the purpose such as the improvement of trusted Java-AP software, and the change of the transmission mode for the purpose such as alleviating the burden on IP server unit 13. To achieve the latter change, IP which administers IP server unit 13 and IP server unit 14, as shown in FIG. 22, stores Jar file 206 after the change (hereinafter, referred to as Jar file 215) in fixed memory 14A of IP server unit 14, and produces ADF 216 by changing the content of ADF 205 in accordance with Jar file 215. The above-mentioned operation is required for transmission of trusted Java-AP software after the change, and no operation is required for the communication provider, which administers administering server unit 18. In other words, the communication provider does not need to change list file 200 or SDF 204.

Figure 23:
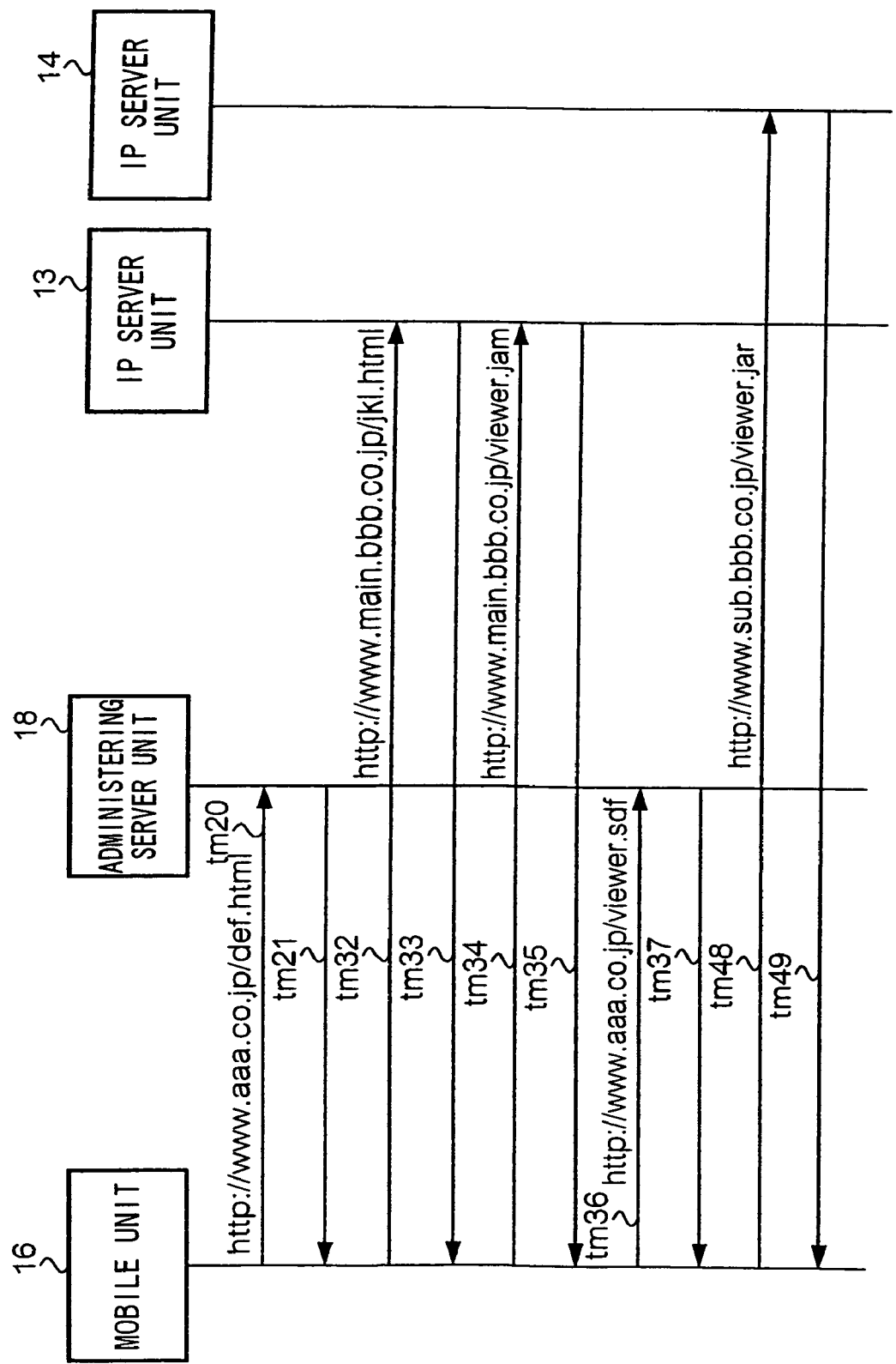
FIG. 23 is a sequence diagram for explaining another operation of the transmission system.

The installation operation of trusted Java-AP software after such changes is shown in FIG. 23. The operation shown in FIG. 23 begins to differ from the operation shown in FIG. 19 when mobile unit 16 requests the Jar file. In both figures, response message tm 47 corresponds to response message tm 37, response message tm 48 corresponds to response message tm 38, and response message tm 49 corresponds to response message tm 39.

In other words, the operation of FIG. 23 differs from that of FIG. 19 only in that ADF 216 and Jar file 215 are the objects of the process; request message tm 48 requesting transmission of Jar file 215 identified by package URL contained in ADF 216 ("http://www.sub.bbb.co.jp/viewer.jar") is produced in mobile unit 16; request message tm 48 is transmitted by mobile unit 16, and received by IP server unit 14; response message tm 49 containing Jar file 215 is produced in IP server unit 14; and response message tm 49 is transmitted by IP server unit 14, and is received by mobile unit 16.

As explained above, in mobile unit 16, the operation in accordance with the content of policy information contained in the downloaded SDF is approved by trusted Java-AP software corresponding to SDF, and the operation, which is not contained in the content of policy information, is not approved. Since policy information is transmitted from administering server unit 18 to mobile unit 16 with the security assured, policy information cannot be falsified by a third person, and the trustworthiness of trusted Java-AP is assured in this manner. Also, from the user's perspective, the convenience of the operation improves significantly since the above-mentioned trusted Java-AP with a greater freedom of operation approved becomes available, in addition to conventional non-trusted Java-AP.

In the above-mentioned transmission system, each file is transmitted to mobile unit 16 in the order of ADF, SDF, and the Jar file. Transmitting the files in this order produces the effects explained below.

As already explained, Java-AP software (ADF and the Jar file) is designed and produced by IP, and becomes available to general users at exclusive sites each IP opens on the Internet (IP server units 12-14 in FIG. 1). Hence, the user first accesses the exclusive site of IP, and usually determines whether to download the software by referring to explanatory pages of several Java-AP software. Then, when the user determines to download Java-AP software, the user needs to carry out the operation to command the downloading process. To support this process, URL of the file, which should be downloaded next is usually contained in the above-mentioned explanatory page for the purpose of downloading by anchor tag. At this stage, from the IP's perspective, inserting URL of ADF into the explanatory page is most efficient because IP constantly keeps track of the URL of ADF since ADF is administered by IP. On the other hand, if URL of SDF is to be inserted into the explanatory page, IP constantly has to confirm the authenticity of URL by inquiring the communication provider and so forth. Therefore, transmitting in the order of ADF, SDF, and the jar file is quite meaningful.

Also, the above-mentioned order is advantageous when the process for version upgrade of Java-AP software, which is carried out in i-mode (trademark registered) of NTT DoCoMo is taken into account. In the current service specification of i-mode, when a user carries out the operation to request version upgrade, the mobile unit first refers to the content written in ADF, and obtains the Jar file after version upgrade on the basis of package URL written in ADF. In other words, during version upgrade, ADF is first referred to, and the process of downloading is carried out thereafter. Taking the above-mentioned fact into account, even during version upgrading of the transmission system of the present invention, the current service specification does not need to be changed much by initiating the whole process by referring to ADF, obtaining SDF on the basis of SDF-URL written in ADF, and obtaining the Jar file; since the process thereafter can be carried out in the same flow as that of the ordinary downloading process of SDF followed by the Jar file. On the other hand, if downloading of each file is defined by the order of SDF, ADF and the Jar file when version upgrade is attempted, the process of obtaining the Jar file is carried out without obtaining SDF if the downloading process is initiated by referring to ADF. Inconvenience can occur to security without SDF since SDF can be rewritten during version upgrading. Even from the above perspectives, transmitting each file in the order of ADF, SDF and the Jar file is meaningful.

(3) Modification

The present invention is not limited to the above-mentioned embodiment, and several modifications such as the ones described below are possible.

In the above-mentioned transmission system, the mobile unit confirms the authenticity of correspondence between the producer of SDF and that of ADF by using signature data by the secret key and the public key. In actuality, however, transmission need not be limited to the above-mentioned transmission method as long as the method used can confirm the authenticity of correspondence between the producer of SDF and that of ADF.

Also, depending upon the security level required for the system, the number of processes in the mobile unit and the IP server unit, or the amount of communication among the mobile unit, the administering server unit and the IP server unit can be alleviated by the mode which does not contain the public key in SDF; does not sign ADF by using the secret key in the IP server unit; and omits the confirmation process of the signature in the mobile unit.

Also, in the above-mentioned transmission system, the hash value of the Jar file is included in ADF corresponding to the Jar file; and the hash value of the Jar file is produced in the mobile unit; then the authenticity of the correspondence of the Jar file and ADF is confirmed by comparing the hash value in ADF to the produced hash value. However, any method can be used without limiting to the above-mentioned method as long as the method can confirm the authenticity of correspondence between the Jar file and ADF.

Also, depending upon the security level required for the system, the number of processes in the mobile unit and the IP server unit, and the amount of communication between the mobile unit and the IP server unit can be alleviated by omitting the confirmation process of including the hash value in ADF.

Also, in the above-mentioned transmission system, whether the correspondence of SDF with ADF (and the Jar file) is authentic is determined by using the inherent APID to trusted Java-AP, but authenticity of the correspondence of SDF with ADF (and the Jar file) can be determined by using the CID inherent to the information provider, which provides trusted Java-AP. Also, depending upon the security level required for the system, the determination made on the basis of APID and CID can be omitted.

Also, in the above-mentioned transmission system, the server is specified by using the domain name, but the server can also be specified by using the IP address.

Also, in the mobile unit, by comparing the domain name in SDF-URL contained in ADF to a preset letter string, SDF can be determined to be authentic only when the domain name is that of a server unit administered by a trustworthy organization. In this case, when the domain name differs from the preset letter string, mobile unit 16 displays a message that acquisition of SDF has failed, and finishes the process without requesting administering server unit 18 for SDF.

Also, in this mode, the letter string to be compared (for example, the letter string showing the domain name of the communication provider) is pre-stored in ROM or the fixed memory of the mobile unit. In the mode of pre-storing in ROM, higher security can be assured since the letter string cannot be rewritten. Also, in the mode of pre-storing in the fixed memory, trustworthy organizations can be stored after the purchase of the mobile unit; therefore, excellent convenience can be provided to a user and a trustworthy organization.

Also, in the above-mentioned transmission system, a high level of security is assured with a communication provider, which provides the communication path used for transmission of SDF as a trustworthy organization, but the technological scope of the present invention includes the mode in which the communication path is not provided by a trustworthy organization. For example, by connecting a trustworthy organization to a mobile unit by using an encrypted communication path, the trustworthy organization can transmit SDF via the encrypted communication path. Also, even if the security of the communication path is not assured, by transmitting after encrypting SDF, and decoding SDF in the mobile unit, SDF can be transmitted with a certain degree of security.

In the above-mentioned transmission system, a file is transmitted and received in accordance with HTTP, but the system can be modified to assure higher security by using HTTPS.

Also, in the above-mentioned transmission system, a trustworthy organization can be an IP, in other words, the administering unit could comprise an IP server unit.

Moreover, in the above-mentioned transmission system, API is the object for restricting the use by Java-AP, but the present invention is not limited to the above-mentioned description, and any resource can be the object. The resource can be a hardware resource. Also, the resource can be a network resource, or a software resource (explained later). A hardware resource can be a resource such as a memory, a speaker, a microphone, an infrared controller, LED (Light Emitting Diode) which a mobile unit can be equipped with, or an external hardware box such as UIM (User Identity Module) or SIM (Subscriber Identity Module) which functions with the mobile unit.

Next, a network resource is explained. As mentioned above, the mobile unit performs radio communication with the mobile communication network. During radio communication, the mobile unit uses a radio resource such as a radio channel provided by the mobile communication network. The radio resource is one of network resources. Also, the mobile unit, in a higher communication protocol layer than the communication protocol layer the radio resource belongs to, uses a communication resource such as a transmission path of packets or a communication path of the connecting network. The communication resources such as these are included as a network resource.

Next, a software resource is explained. A software resource can be API, a class, a package and so forth. Various functions are provided by a software resource, but a typical function can be a computation process such as encryption computation, or a function of transmitting or receiving data with other applications such as a Web browser. Also, the technological scope of the present invention includes the mode of restricting the use of a software resource, which the above-mentioned external hardware box is equipped with.

Incidentally, the use of a hardware resource or a network resource by Java-AP generally takes place by using a software resource. A mobile unit of the above-mentioned transmission system is also equipped with a software resource to use a hardware resource or a network resource, and by restricting the use of a software resource of this type; the use of a hardware resource or a network resource is indirectly restricted. By indirectly restricting in this manner, and by preparing various software resources, restrictions which cannot be achieved unless restriction on a plurality of resources are changed in detail, such as giving the right to change the authorization of Java-AP of the mobile unit or others to only trusted Java-AP among all Java-APs, lifting the restriction on allowing to communicate only with a server unit accessed for downloading, or allowing to access a specific memory domain of the memory can easily be specified. Also, the mode of indirectly restricting the use of a software resource of the above-mentioned external hardware box by restricting the use of a software resource installed inside the mobile unit is included in the technological scope of the present invention.

With regard to a method of expressing permission, a flag (permit/forbid) corresponding to one resource can be used, or permissions of a plurality of resources can be denoted by one piece of information.

Also, in the present invention, the types of permission can be denoted to permit (or forbid) the use of a resource with a plurality of types. In this case, in the mobile unit, a more precise control can be achieved. For example, since modes of both reading out and writing in (types of use) exist in the memory, the memory can be used for both reading out and writing in by trusted Java-AP although the memory is used only for reading out by non-trusted Java-AP. Also, for example, when the Web browser and so forth are activated while Java-AP with the right to use a packet transmission path is activated in a mobile unit in which a plurality of applications can share one packet transmission path, control can be such that Java-AP which is permitted to "exclusively use a packet transmission path" can exclusively use a packet transmission path although the Java-AP which is not permitted to "exclusively use a packet transmission path" cannot exclude the sharing of packet transmission path by a Web browser and so forth.

Also, by further modifying the above-mentioned example, the following control can be possible. In other words, Java-AP with a certain type of permission can exclusively use the packet communication path without the user's consent. Also, Java-AP with another permission can use the packet communication path without the user's consent, but needs to obtain the user's consent to exclusively use the packet communication path. Also, Java-AP with another permission can use the packet communication path without the user's consent, but cannot exclusively use the packet communication path. Also, Java-AP with another permission can use the packet communication path only with the user's permission. Also, Java-AP with another permission cannot even use the packet communication path. As it is obvious from these examples, "types of use" of the present invention also contain types of a process when a resource is used (a process of obtaining the user's consent/a process of not obtaining the user's consent)

Also, in the above-mentioned transmission system, an identical list page is provided for all mobile units, but a different list page can be provided for each mobile unit.

Also, in the above-mentioned transmission system, the operation of Java-AP is restricted when the Java-AP is executed. Instead, by including policy information in the Jar file stored in the IP server unit, and when the Jar file is downloaded in the mobile unit, activation of the Java-AP corresponding to the Jar file, or installation of Java-AP software containing the Jar file can be forbidden if comparison between the policy information and the policy information in SDF results in a mismatch. Only the permission given to the item as a result of the match in policy information can be valid.

The public key of the communication provider is provided to mobile unit 16 from IP server units 12-14 by being contained in ADF. However, instead of limiting the provision of public key as described, the public key can be pre-stored in the mobile unit. With regard to methods of pre-storing the public key in the mobile unit, methods such as transmitting through communication and by pre-storing in the fixed memory, or selling the mobile unit after writing the public key into ROM, are possible.

Also, in the above-mentioned transmission system, software is delivered to a mobile unit, but the technological scope of the present invention includes the mode of transmitting software to a terminal unit besides a mobile unit.

In the above-mentioned transmission system, when the expiration date of trusted Java-AP software is reached, the process for renewing its expiration date begins. However, instead of limiting the timing of renewal to the above-mentioned one, various modes such as arbitrary timing as the user wishes, or periodical timing such as once at the end of each month can be adopted.

Also, with regard to the method of setting the expiration date, the expiration date can be set in accordance with the date as already explained, and for example, by the period after trusted Java-AP software is downloaded (for example, when trusted Java-AP is available only for a month after its installation), or the expiration date can be set by the number of times of execution, or the period of execution of trusted Java-AP software. In other words, the expiration date can be any information as long as the upper threshold is set so as not to allow Java-AP software to be limitlessly executed.

For example, when the expiration date is set by the number of times execution is carried out, the necessary information can be drawn from JAM, which refers to policy information in SDF each time trusted Java-AP software is activated, and the same number of references carried out by JAM can be counted as the number of times execution of trusted Java-AP software is carried out. When the counted number of times of execution reaches the pre-determined number, the renewal process can be initiated.

Also, when the means of accumulating and counting the period when trusted Java-AP software is executed (for example, the means such as writing in the trusted Java-AP software as a subroutine) is equipped, counting is possible even when the expiration date is set by the period of execution. Then, when the period of execution counted reaches the pre-determined time, the renewal process can be initiated.

In the explanation of the above-mentioned transmission system, the expression "the expiration date of trusted Java-AP software" is used, but more precisely, the expiration date can be that of the Jar file itself, or even that of both.

Also, in the above-mentioned transmission system, execution of trusted Java-AP software whose expiration date is reached is forbidden when the expiration date is reached but cannot be renewed. However, trusted Java-AP software can be changed to non-trusted Java-AP software when its expiration date is reached, instead of limiting in the manner as described above. In other words, Java-AP software whose expiration date is reached is regarded as non-trusted Java-AP software, and is subject to greater restriction as non-trusted Java-AP software after the change.

Also, the above-mentioned embodiment can be modified so as to let SDF of any trusted Java-AP software expire.

In the example of the modification, the administering server unit is equipped with the memory unit to store SDF of several kinds of Java-AP software as in the above-mentioned embodiment. When the controller of the administering server unit receives each SDF from the communication unit, or when the controller receives SDF stored in the memory medium, the controller stores SDF in the memory unit.

Also, to the administering server unit, the command to void the SDF for any trusted Java-AP software can be inputted. The command contains APID of the trusted Java-AP software to which SDF to be voided corresponds. The command as such is inputted to the inputting unit of the administering server unit by the operator; or the command is transmitted to the administering server unit from the relevant IP server unit via the network, and is received by the reception unit of the administering server unit. When the controller of the administering server unit receives the command via the inputting unit or the communication unit, the controller stores information showing that SDF identified by APID in the command is voided in the memory unit. As a result, in the administering server unit, the disclosure of SDF discontinues, and downloading of the Java-AP software using SDF becomes impossible.

A case such as when SDF of certain trusted Java-AP software is transmitted to a certain terminal unit, and SDF is voided thereafter could be also possible. In such a case, SDF which has already been transmitted should be voided so as not to function as SDF. For this purpose, the following method can be used. In other words, the terminal unit inquires the administering server unit about the validity of SDF in a constant period of time, and when the response showing that SDF is voided returns from the administering server unit, the terminal unit forbids the use of SDF thereafter. At this stage, shortening of the time period for inquiry is effective in decreasing the number of times execution of trusted Java-AP software is carried out after SDF is voided. However, if such a method is adopted by each terminal unit independently, the traffic becomes enormous, and the communication fee the user must pay also becomes high. On the other hand, among the users of terminal units, some users frequently command the execution of trusted Java-AP whereas some users command the execution of trusted Java-AP software only at times; hence, increasing the traffic and the communication fee for the latter people is not wise.

To solve the above-mentioned problem, a process is carried out in the present embodiment as follows. First, the administering server unit includes frequency data N and period data T when administering server unit transmits SDF from the communication unit to a terminal unit. At this stage, frequency data N is the data to command transmission of inquiry about the validity of SDF whenever the number of times execution of trusted Java-AP software is carried out exceeds the integral multiple of N. Also, period data T is the data to command transmission of inquiry about the validity of SDF when time T passes after the execution of trusted Java-AP software, and before the execution of Java-AP software is next initiated.

Figure 24:
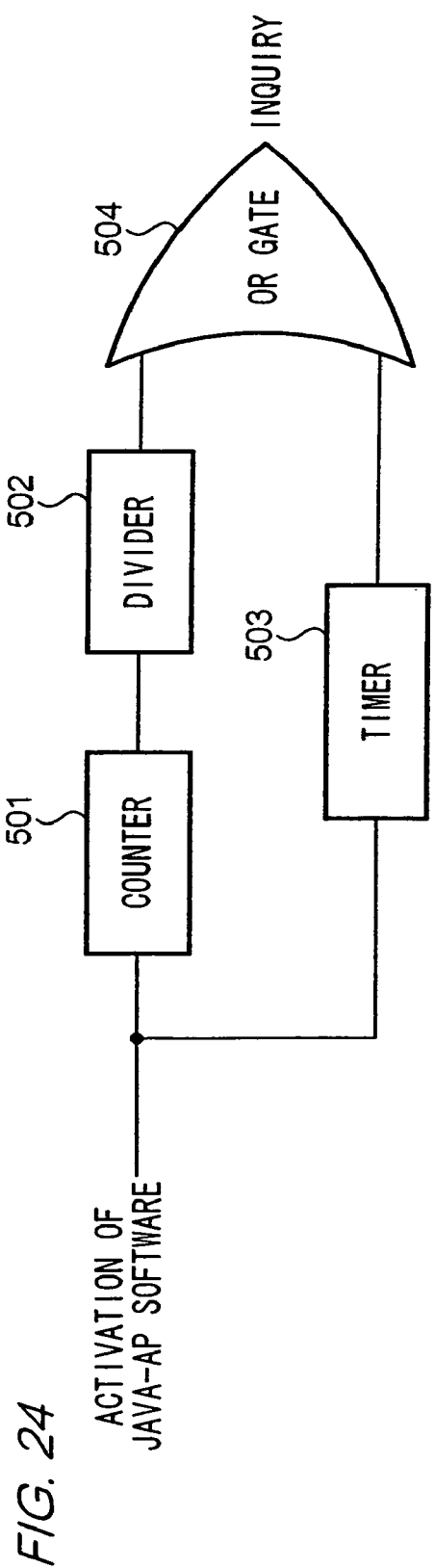
FIG. 24 is a diagram showing the configuration within the controller of a mobile unit, which carries out a process for inquiring the validity of the SDF.

When the terminal unit receives certain SDF, the terminal unit transmits to the administering server unit the inquiry about the validity of SDF in accordance with frequency data N and period data T in SDF. The configuration of the controller for carrying out the process for certain SDF is shown in FIG. 24. When a plurality of SDFs are stored in the terminal unit, controllers shown in FIG. 24 are equipped for the same number of SDFs. The elements denoted by codes 501-504 in FIG. 24 show the circuit comprising the controller, or the routine executed by the controller.

First, when the controller of the terminal unit receives SDF, the controller activates the circuit shown in FIG. 24 or the routine for SDF. Then the controller extracts frequency data N and period data T from SDF. Then frequency data N is given to divider 502, and period data T is given to timer 503.

Counter 501 adds the counted number by one whenever trusted Java-AP software corresponding to SDF is activated. Divider 502 divides the counted number from counter 501 (in other words, the number of times, activation of trusted Java-AP software is carried out) by frequent data N, and outputs signal "1" when the remainder as a result of the division becomes one.

Timer 503 specifically is a decrementing counter. When trusted Java-AP software is activated, period data T is written into timer 503 as the initial value of the counted value. Hereinafter, timer 503 proceeds with decrementing count by being synchronized with the clock of the specific frequency. Then, when the period of time T is counted down, timer 503 outputs signal "1." When trusted Java-AP software is reactivated before the period of time T is counted down, period data T is set to timer 503, and the new decrementing count begins from that time on.

OR gate 504, when signal "1" is outputted from divider 502 or timer 503, generates a signal to command inquiry about the validity of SDF.

Figure 25:
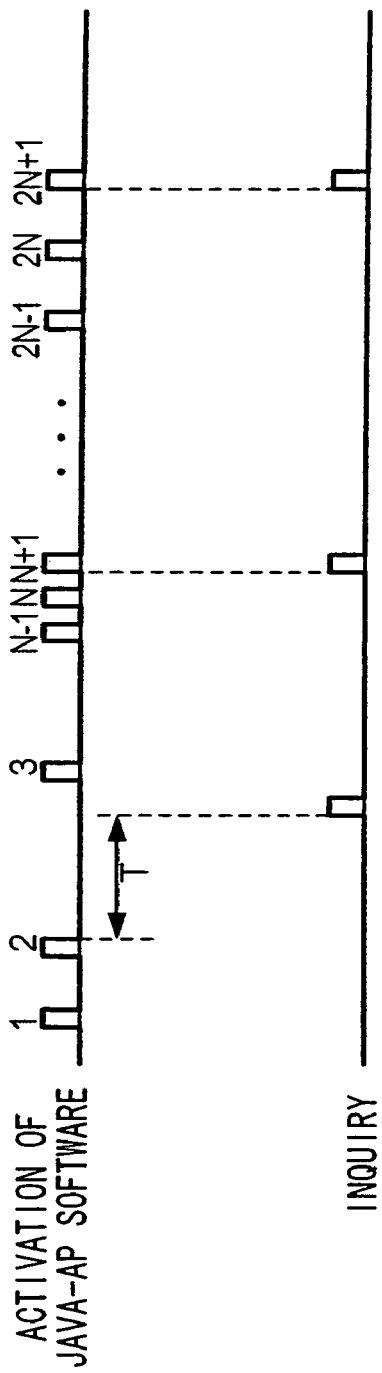
FIG. 25 is a time-chart showing the operation of inquiring the validity of the SDF.

FIG. 25 is a time-chart showing the above-mentioned operation. As shown in the figure, OR gate 504 generates a signal to command inquiry about the validity of SDF such as N+ the first time, 2N+ the first time with frequency data N given. The controller, when the signal is generated, transmits to the administering server unit inquiry about the validity of SDF by the communication unit. The inquiry contains APID to identify SDF, which is the object. When the controller of the administering server unit receives the inquiry from the communication unit, checks whether SDF identified by APID being inquired is valid by referring to the memory unit, and returns the outcome to the terminal unit by the communication unit. When the controller of the terminal unit receives from communication unit, a response that inquired SDF has expired, the controller carries out the operation so as not to allow Java-AP software corresponding to SDF to be activated.

Also, in the example shown in FIG. 25, a signal to command inquiry about the validity of SDF is generated since the time elapsed has exceeded T after the second time of execution of trusted Java-AP software before the third time of execution. Even in this case, the same inquiry, the response from the administering server unit, and the operation of the terminal unit in accordance with the response as the above-mentioned ones is carried out.

Some of the advantages of the above-mentioned modification are as follows.

First, if one uses trusted Java-AP software frequently, inquiry is not carried out when operation of inquiry generation is performed on the basis of period data T since trusted Java-AP software is always activated before time T is counted down. Hence, the method of inquiring when the number of times activation is carried out exceeds N is effective.

On the other hand, if one only uses trusted Java-AP software occasionally, timely voiding of SDF is impossible since the number of times activation is carried out does not often exceed N. Hence, for such users, the method of inquiring when the time elapsed after the activation exceeds T is effective.

The present modification is effective for both types of users since both methods are used parallel to each other.

The invention claimed is:

1. A terminal unit comprising:
a memory in communication with a processor; and
the processor configured to:
communicate with a wireless network portion of a transmission system;
transmit, via the wireless network, a first transmission request in order to receive an application descriptive file from an information provider server in the transmission system based on a storage location of the application descriptive file in the transmission system;

store the application descriptive file in the memory after receipt of the application descriptive file,
wherein the application descriptive file includes a storage location for application software in the transmission system and a storage location of a security descriptive file in the transmission system;
transmit a second transmission request, via the wireless network, comprising the storage location of the security descriptive file stored in the application descriptive file in order to receive the security descriptive file associated with the application software;
in response to receipt of the security descriptive file, store the security descriptive file associated with the application software, wherein the security descriptive file includes authorization information associated with the application software, and wherein the authorization information includes an authorization to execute the application software on the processor of the terminal unit;
transmit a third transmission request to receive the application software based upon the storage location for application software stored in the application descriptive file;
restrict operation of the application software on the processor of the terminal unit in accordance with the authorization information contained in the security descriptive file.

2. The terminal unit of claim 1, wherein at least a portion of the security descriptive file received by the terminal unit is encrypted; and
wherein the processor is further configured to decrypt the security descriptive file.

3. The terminal unit of claim 1, wherein the storage location of the security descriptive file is stored on an administration server corresponding to a storage location within a network;
wherein a communication path between the administration server and the terminal unit is fully contained within the network administered by a communication provider of the wireless network.

4. The terminal unit of claim 1,
wherein the application descriptive file includes a public key of a communication provider that provides communication service to the terminal unit;
wherein the security descriptive file is signed by a secret key of the communication provider; and
wherein the processor is further configured to:
determine authenticity of the security descriptive file received in response to the second transmission request based upon the public key of the communication provider included in the application descriptive file; and
transmit a fourth transmission request, via the wireless network, to receive the application software based upon the storage location of the application software in response to determination of the authenticity of the security descriptive file.

5. The terminal unit of claim 1, wherein the application descriptive file includes a first application identifier and the security descriptive file includes a second application identifier; and
wherein the processor further configured to:
compare the first application identifier of the application descriptive file to the second application identifier of the security descriptive file; and
transmit the third transmission request to receive the application software only when the first identifier matches the second identifier.

6. The terminal unit of claim 1, wherein the processor is further configured to:
determine whether the storage location of the security descriptive file included in the application descriptive file is in an administration server permitted to provide the security descriptive file; and
transmit the second transmission request to receive the security descriptive file based upon the determination that the storage location of the security descriptive file included in the application descriptive file is in the administration server permitted to provide the security descriptive file.

7. The terminal of claim 6, wherein a communication path between the administration server authorized to provide the security descriptive file and the terminal unit is physically secured within a network of a communication provider of the wireless network.

8. The terminal unit of claim 1, wherein the security descriptive file includes time limit information that indicates an expiration date of the application software associated with the security descriptive file; and
wherein the processor further configured to:
determine whether authorization to execute the application software on the terminal unit has expired based upon the time limit information of the security descriptive file;
request transmission of an updated security descriptive file from the transmission system based upon determination that the authorization to execute the application software on the terminal has expired;
receive the updated security descriptive file from the transmission system; and
renew the expiration date of the application software based upon an updated expiration date included in the updated security descriptive file.

9. The terminal unit of claim 8,
wherein the terminal unit renews the expiration date of the application software only when the updated security descriptive file is received from the storage location of the security descriptive file included in the application descriptive file.

10. A transmission system comprising:
an application software program executable on a mobile terminal, wherein the application software program is stored at a first storage location accessible with the transmission system;
a security descriptive file stored at a second storage location accessible with the transmission system, wherein the security descriptive file includes authorization information for the mobile terminal to execute the application software program;
an application descriptive file stored at a third storage location accessible with the transmission system, wherein the application descriptive file includes a first address for the first storage location accessible with the transmission system and a second address for the second storage location accessible with the transmission system; and
an administration server configured to administer access to the security descriptive file, wherein the administration server unit is configured to transmit the security descriptive file to the mobile terminal in response to a request for the security descriptive file as a function of the second address for the second storage location accessible with the transmission system.

11. The transmission system of claim 10, further comprising:
   an information provider server accessible with the transmission system, wherein the information provider server is configured to administer access to the application descriptive file;
   wherein the information provider server is further configured to transmit the application descriptive file to the mobile terminal in response to a request for the application descriptive file from the mobile terminal; and
   wherein the request for the application descriptive file is a function of the third storage location accessible with the transmission system.

12. The transmission system of claim 11, wherein the information provider server is further configured to administer access to the application software program executable on the mobile terminal;
   wherein the information provider server is further configured to transmit the application software program to the mobile terminal in response to a request for the application software program from the mobile terminal; and
   wherein the request for the application software program is a function of the first address for the first storage location accessible with the transmission system contained in the application descriptive file.

13. The transmission system of claim 11, wherein a second information provider server is configured to administer access to the application software program executable on the mobile terminal;
   wherein the information provider server is further configured to transmit the application software program to the mobile terminal in response to a request for the application software program from the mobile terminal; and
   wherein the request for the application software program is a function of the first address for the first storage location accessible with the transmission system contained in the application descriptive file;
   the administration server configured to receive a request from the terminal unit for the validity information of the security descriptive file; and
   in response to the request for the validity information of the security descriptive file, the administration server further configured to send the validity information of the security descriptive file to the terminal unit, wherein the sent validity information provides an indication of the extendibility of the expiration date.

14. A method of distributing trusted software applications for use on terminal units deployed in a transmission system comprising:
   a terminal unit sending a request for receipt of an application descriptive file associated with an application software based upon a storage location in communication with the terminal unit via the transmission system;
   in response to receipt of the application descriptive file, the terminal unit extracting a storage location of the application software file from the application descriptive file, wherein the terminal is in communication with the storage location of the application software file via the transmission system;
   in further response to receipt of the application descriptive file, the terminal unit extracting a storage location of a security descriptive file from the application descriptive file, wherein the security descriptive file is associated with the application software file and includes authorization information for execution of the application software on a terminal unit, and wherein the terminal is in communication with the storage location of the application software file via the transmission system;
   the terminal unit transmitting a request for transmission of the security descriptive file to an administration server as a function of the storage location of the security descriptive file extracted from the application descriptive file; and
   in response to reception of the security descriptive file, the terminal transmitting a request to receive the application software file based upon the storage location of the application software file included in the application descriptive file.

15. The method of claim 14, wherein the storage location of the application software file is located on a server other than a server that corresponds to the storage location of the application descriptive file.

16. The method of claim 14, wherein the terminal transmitting the request to receive the application software file based upon the storage location of the application software file included in the application descriptive file comprising:
   the terminal determining whether the authorization information for execution of the application software is valid; and
   the terminal transmitting the request to receive the application software based upon determination that the authorization information for execution of the application software is valid.

17. The method of claim 14, wherein the application descriptive file includes contents dependent upon the application software file, a storage location of the application software file, and a storage location of the security descriptive file.

18. The method of claim 14, the terminal transmitting the request to receive the application software file based upon the storage location of the application software file included in the application descriptive file comprising:
   the terminal extracting a first application program identifier associated from the application descriptive file;
   the terminal extracting a second application program identifier from the security descriptive file;
   the terminal determining whether the first application program identifier extracted from the application descriptive file and second application program identifier match extracted from the second application program identifier;
   the terminal transmitting a request to receive the application program based upon determination that the first application identifier and second application program identifier match.

* * * * *

UNITED STATES PATENT AND TRADEMARK OFFICE
CERTIFICATE OF CORRECTION

PATENT NO. : 7,587,592 B2
APPLICATION NO. : 10/509545
DATED : September 8, 2009
INVENTOR(S) : Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1335 days.

Signed and Sealed this

Twenty-first Day of September, 2010

David J. Kappos
*Director of the United States Patent and Trademark Office*